(12) United States Patent  
Gu et al.

(10) Patent No.: US 8,930,134 B2
(45) Date of Patent: Jan. 6, 2015

(54) SYSTEMS AND METHODS FOR HIGH-PRECISION INDOOR POSITIONING, NAVIGATION AND SHOPPING BEHAVIOR PROFILING

(75) Inventors: Xiaoyuan Gu, Chicago, IL (US); Vinod K. Ekambaram, Schaumburg, IL (US); Abhishek Ramani, Schaumburg, IL (US); Jen-Hao Yang, Schaumburg, IL (US); Giuseppe M. Di Prizio, Chicago, IL (US); Charles Jones, Chicago, IL (US)

(73) Assignee: Sears Brands, LLC, Hoffman Estates, IL (US)

( * ) Notice: Subject to any disclaimer, the term of this patent is extended or adjusted under 35 U.S.C. 154(b) by 140 days.

(21) Appl. No.: 13/494,758

(22) Filed: Jun. 12, 2012

(65) Prior Publication Data

US 2013/0332273 A1   Dec. 12, 2013

(51) Int. Cl.
 *G01C 21/34* (2006.01)
 *G06Q 30/06* (2012.01)
 *G01C 21/20* (2006.01)

(52) U.S. Cl.
 CPC .......... *G01C 21/206* (2013.01); *G06Q 30/0639* (2013.01)
 USPC ......................................... 701/434; 705/26.9

(58) Field of Classification Search
 CPC .......................... G06Q 30/0639; G01C 21/206
 USPC .................................. 701/410, 434; 705/26.9
 See application file for complete search history.

(56) References Cited

U.S. PATENT DOCUMENTS

| | | | |
|---|---|---|---|
| 6,912,507 B1 * | 6/2005 | Phillips et al. | 705/7.13 |
| 6,954,735 B1 * | 10/2005 | Djupsjobacka et al. | 705/26.8 |
| 7,006,982 B2 | 2/2006 | Sorensen | |
| 7,606,728 B2 | 10/2009 | Sorensen | |
| 7,775,430 B2 * | 8/2010 | Lin | 235/383 |
| 7,778,863 B2 | 8/2010 | Yoshida et al. | |

(Continued)

OTHER PUBLICATIONS

ConnectBlue web page, "Bluetooth Low Energy Technology", Google date: Jun. 5, 2012, 4 pages, downloaded from http://www.connectblue.com/technologies/bluetooth-low-energy-technology/.*

(Continued)

*Primary Examiner* — Behrang Badii
*Assistant Examiner* — David Testardi
(74) *Attorney, Agent, or Firm* — McAndrews, Held & Malloy, Ltd.

(57) ABSTRACT

A positioning system for determining the location of a portable device includes a radio network. The radio network includes radio network nodes for communicating with the portable device and measuring signal strength from the portable device. The radio network also includes a Near Field Communication node for communicating with the portable device and at least initially providing the portable device with configuration information to enable the portable device to pair with the radio network nodes. The system also includes a positioning server for receiving signal strength information from the radio network, determining a location of the portable device, providing the portable device with a graphical representation of its location within a floorplan, receiving an indication of a desired product from the portable device, determining a location of the product, calculating and providing the portable device with a route from the location of the portable device to the product.

21 Claims, 19 Drawing Sheets

(56) References Cited

U.S. PATENT DOCUMENTS

| | | | |
|---|---|---|---|
| 7,826,862 B2* | 11/2010 | Malik et al. | 455/522 |
| 7,911,347 B2 | 3/2011 | Lee et al. | |
| 8,060,412 B2* | 11/2011 | Rosenbaum et al. | 705/26.1 |
| 8,135,629 B2* | 3/2012 | Fuzell-Casey et al. | 705/26.9 |
| 2005/0242180 A1* | 11/2005 | Byford | 235/385 |
| 2005/0256786 A1* | 11/2005 | Sands et al. | 705/28 |
| 2006/0259346 A1 | 11/2006 | Williamson | |
| 2007/0191026 A1* | 8/2007 | Teplitsky | 455/456.3 |
| 2009/0012704 A1* | 1/2009 | Franco et al. | 701/200 |
| 2009/0170483 A1* | 7/2009 | Barnett et al. | 455/414.2 |
| 2009/0319182 A1* | 12/2009 | Monteverde | 701/209 |
| 2010/0121567 A1* | 5/2010 | Mendelson | 701/206 |
| 2011/0276385 A1* | 11/2011 | Keller | 705/14.38 |
| 2012/0023034 A1* | 1/2012 | Lynch et al. | 705/346 |
| 2012/0116887 A1* | 5/2012 | Norair | 705/14.64 |
| 2012/0131098 A1* | 5/2012 | Wood et al. | 709/203 |
| 2012/0259732 A1* | 10/2012 | Sasankan et al. | 705/26.9 |
| 2013/0138534 A1* | 5/2013 | Herwig | 705/26.62 |
| 2013/0191246 A1* | 7/2013 | Calman et al. | 705/26.9 |
| 2013/0268400 A1* | 10/2013 | Ballard et al. | 705/26.8 |
| 2013/0346204 A1* | 12/2013 | Wissner-Gross et al. | 705/14.58 |

OTHER PUBLICATIONS

In-building location using Bluetooth, Miguel Rodriguez, Juan P. Pece, Carlos J. Escudero, Proc. IWWAN, 2005.

Design and Analysis of a Bluetooth-based Indoor Localization System, Raffaele Bruno and Franca Delmastro, Proc. Personal Wireless Communication (PWC 2003), Venezia, Italy, Sep. 2003.

Bluetooth Enables In-door Mobile Location Services, S. Thongthammacharl and H. Olesen Center for Tele-Information, vol. 3, Apr. 2003, pp. 2023-2027.

On Indoor Position Location With Wireless LANs, P. Prasithsangaree, P. Krishnamurthy, P.K. Chrysanthis, in Proc. of 13th IEEE Intl Symposium on Personal Indoor and Mobile Radio Communications, Sep. 2002.

http://www.paywithisis.com/whatis.xhtml, Isis Webpage, accessed May 23, 2012.

Compass: A Probabilistic Indoor Positioning System Based on 802.11 and Digital Compasses, Thomas King, Stephan Kopf, Thomas Haenselmann, Christian Lubberger, and Wolfgang Effelsberg, in Proc. of 1st ACM Intl Workshop on Wireless Network Testbeds, Experimental Evaluation and Characterization (WiNTECH), Los Angeles, USA, Sep. 2006.

WiPS: Location and Motion Sensing Technique of IEEE 802.11 Devices, Teruaki Kitasuka, Kenji Hisazumi, Tsuneo Nakanishi and A. Fukuda, in Proc. of 3rd. International Conference on Information Technology and Applications (ICITA '05), pp. vol. II, 346-349, Jul. 4-7, 2005.

http://www.google.com/wallet/partners.html, Google Wallet Website, accessed May 23, 2012.

http://dognpony.wordpress.com/2011/10/21/why-qr-codes-dont-work-and-the-one-big-thing-agencies, Why QR Codes don't work and the one big thing agencies are missing, Matt Morin, Oct. 21, 2011 (4 pages).

An indoors wireless positioning system based on wireless local area network infrastructure, Y. Wang, X. Jia, H.K. Lee, in Proc. of 6th International Symposium on Satellite Navigation Technology Including Mobile Positioning and Location Services 2003.

http://www.ekahau.com, Ekahau, 2008.

http://www.cellit.com/2011/03/11-reasons-why-qr-codes-suck, 11 Reasons Why QR Codes Suck, Mar. 4, 2011, by David Wachs.

http://www.bloomberg.com/news/print/2011-08-25/tesco-ocado-trial-virtual-shopping-wall, Tesco, Ocado Trial Virtual Shopping Walls to Lure Mobile Users, Sarah Shannon, Aug. 25, 2011 (2 pages).

Radar: An In-Building RF-based User Location and Tracking System, Paramvir Bahl and Venkata N. Padmanabhan, in Proc. IEEE INFOCOM, vol. 2, Mar. 2000, pp. 775-784.

Positioning with Bluetooth, Joseph Hallberg, Marcus Nilsson, Kare Synnes, Proc 10th Untl Conference on Telecommunication, 2003.

Topaz, 2004, www.tadlys.com/pages/Product content. asp?iGlobalId=2.

* cited by examiner

SYSTEMS AND METHODS FOR HIGH-PRECISION INDOOR POSITIONING, NAVIGATION AND SHOPPING BEHAVIOR PROFILING

BACKGROUND

In a large brick-and-mortar retail store setting, it can be a daunting task for a customer to rapidly locate the exact product he/she is looking for. The same is true for the customer to navigate through the store, find a free store associate to assist in shopping, or for a store associate to identify the customer who needs help. With the increase of store foot traffic, these issues are even more prominent.

On the other hand, although online customer profiling has been made easy with analytic tools, offline customer profile building remains a blank. Unless a customer actually purchases something, information about non-transactional behaviors such as looking around, trying a product, interacting with store associates, etc., is typically not captured at all. This non-transactional information, however, is very valuable in acquiring new customers, conducting targeted marketing, product recommendation, and cross/upselling to existing customers. Moreover, offline customer behavior profiling can offer accurate and invaluable insight of a customer or potential customer's lifestyle, preference, shopping pattern and so on. For an integrated retailer, this info can be shared across all channels as to fully explore sales opportunities.

Many companies have tried to bridge the divide between a customer's online and offline shopping behavior by bringing the offline shopping experience online through the use of mobile smartphone applications and printed interfaces for mobile commerce that utilize a Quick Response (QR) Code that provides a URL to eCommerce websites in order for the user to conduct an eCommerce transaction. In this type of a system, a customer uses a smartphone camera and a QR code scanner application to scan the QR code. However, such code recognition can be a painful process, which undermines the user experience. For example, multiple QR code standards prevail, which only adds to the complexity of the implementations of the scanner apps and QR codes. Further, the requirements of a dedicated scanning app, difficulty in aligning the camera due to changing lighting conditions and focusing can detract from the customer experience.

QR codes are also limited to about 7 KB of data, which limits the information contained in a QR code to a URL or simple textual info. QR codes also does not allow for localized interactions between the user and the printed interface; they waste precious space on printed surfaces; and they are subject to modifications and damages rendering the code instantly disabled.

Another way in which retailers have attempted to capture offline behavior is through indoor, location-based tracking. While there are a handful of location-based products available in the market today for various mobile platforms, there does not yet exist an end-to-end platform-based solution that is dedicated towards indoor positioning and indoor navigation. In particular, indoor positioning and navigation have long been a challenging area due primarily to the unavailability of GPS signals indoor, the prohibitive cost of implementation, and the inaccuracy of indoor navigation schemes based on Cellular-ID or Wireless LAN (theoretically, conventional WiFi-based fingerprinting approach can achieve an accuracy of about 1.5 meter, and therefore does not provide product-level granularity).

For example, one such indoor location-based product utilizes radio map fingerprinting, which is a process that captures the impression of the signals of various radio transmitters and generates a signature of such impression. Such an indoor positioning system relies on a pre-populated geo-spatial database that contains numerous waypoints that represent intermediate routing nodes. Georeferencing, i.e. adding coordinates to these nodes, is a time consuming and error-prone task that involves significant manual work and alignment. Oftentimes, the end results are waypoints that are not aligned on a straight line or not at a predefined interval as they are intended to be. This translates into increased labor costs associated with establishing and maintaining such indoor location-based services, hence impacting the bottom line of a business.

In an integrated retail setting, there is currently no mature way to accurately and automatically check-in a customer for either in-store shopping or merchandise pickup for online orders. Existing approaches that rely on geofences or smartphone APIs (such as those provided by Foursquare™) cannot guarantee that a customer actually checks in. Geofencing has only fussy knowledge about the customer's location relative to the store, as anything within the coverage of a geofence (known as proximity) is considered in range, and a customer can check in anywhere within the circle, even if the customer is not actually physically in the store (such as in the parking lot or elsewhere in the mall, including at a competitor's store). On the other hand, using conventional smartphone APIs for check-in can be misleading as it can lead to faked data. Not only is the precision of locations determined by such applications very coarse, but some applications also allow "virtual check-ins" without physical presence of the customer.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

An embodiment of the present invention is directed to a positioning system for determining the location of a portable device includes a radio network. The radio network includes radio network nodes for communicating with the portable device and measuring signal strength from the portable device. The radio network also includes a Near Field Communication node for communicating with the portable device and at least initially providing the portable device with configuration information to enable the portable device to pair with the radio network nodes. The system also includes a positioning server for receiving signal strength information from the radio network, determining a location of the portable device, providing the portable device with a graphical representation of its location within a floorplan, receiving an indication of a desired product from the portable device, determining a location of the product, calculating and providing the portable device with a route from the location of the portable device to the product.

Another embodiment of the present invention is directed to a computer-readable medium embodied in a non-transient, physical memory device having stored thereon computer executable instructions for automated georeferencing. The instructions include receiving indications of a start point and an end point, receiving an indication of an interval between adjacent waypoints, calculating the distance between the start point and the end point, determining the number (N) of waypoints needed between the start point and the end point based on the distance between the start point and end point and the interval, and defining N waypoints between the start point and the end point.

Another embodiment of the present invention is directed to a merchandise pickup system. The system includes a terminal device associated with a customer service agent and a Near Field Communication (NFC) node located external to a store. The NFC node is operable to provide a portable device associated with a customer, and within communication range of the NFC node, a description of the location of the NFC node. The system also includes a merchandise pickup server communicatively coupled with the terminal device and the portable device over one or more communication networks. The merchandise pickup server is configured to receive from the portable device the description of the location of the NFC node, a customer identifier and an order identifier. The merchandise pickup server is also configured to provide the terminal device with the description of the location of the NFC node, the customer identifier, the order identifier and an identification of merchandise associated with the order to be picked up.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
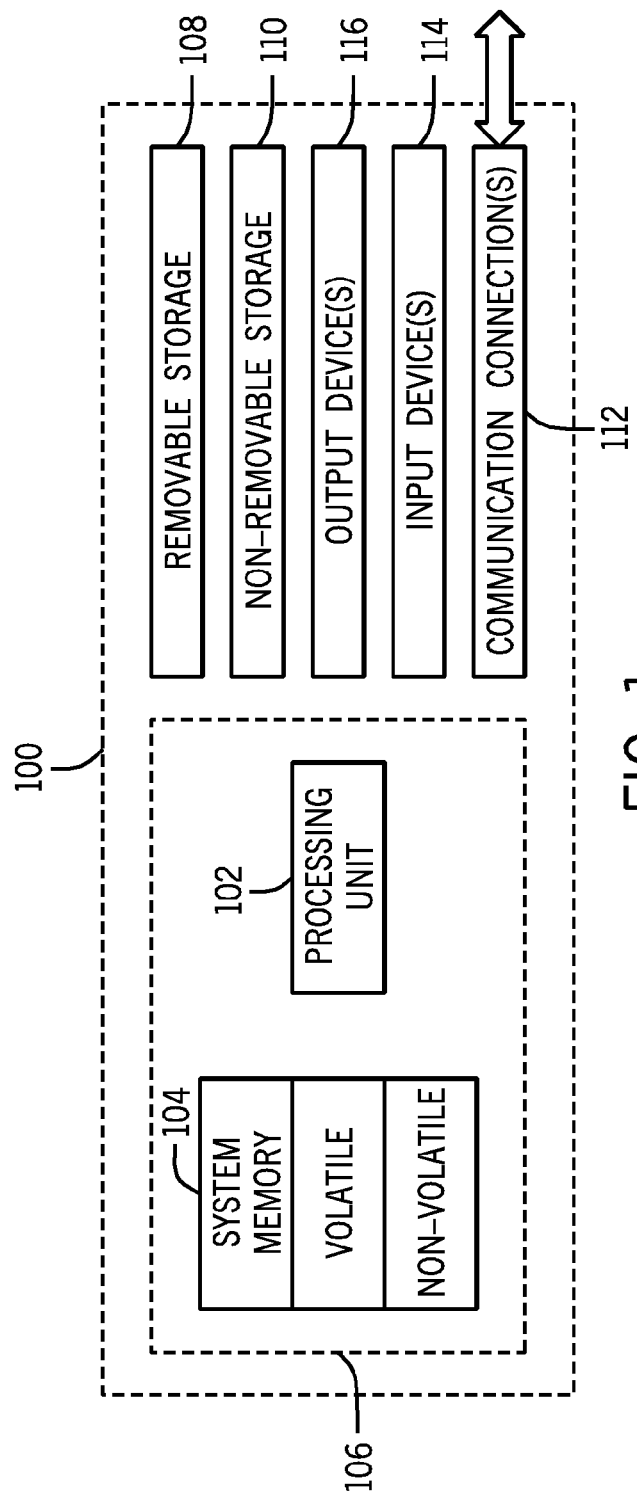
FIG. 1 is a block diagram of an exemplary system for implementing embodiments, in accordance with various embodiments of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer or digital system memory. These may be instructions stored on a non-transient, computer-readable medium. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

With reference to FIG. 1, an exemplary system for implementing embodiments includes a general purpose computing system environment 100, such as a desktop computer, laptop, smartphone, tablet, or the like. In its most basic configuration, computing system environment 100 typically includes at least one processing unit 102 and memory 104. Depending on the exact configuration and type of computing system environment, memory 104 may be volatile (such as RAM), non-volatile (such as ROM, flash memory, etc.) or some combination of the two. This most basic configuration is illustrated in FIG. 1 by dashed line 106. Additionally, computing system environment 100 may also have additional features/functionality. For example, computing system environment 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 100. Any such computer storage media may be part of computing system environment 100.

Computing system environment 100 may also contain communications connection(s) 112 that allow it to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. Computing system environment 100 may also have input device(s) 114 such as a keyboard, mouse, pen, voice input device, touch input device, etc. Output device(s) 116 such as a display, speakers, printer, etc. may also be included. All these devices are well known in the art and need not be discussed at length here.

Throughout the following discussion, reference will be made to flowcharts and sequence diagrams of FIGS. 3, 5, 9, 12, 14-16 and 18-20, which each illustrate example steps used by various embodiments of the present technology. Flowcharts 300, 900, 1200, 1400, 1600, 1800, 1900 and 2000 and sequence diagrams 500 and 1500 include processes that, in various embodiments, are carried out by a processor under the control of computer-readable and computer-executable instructions. The computer-readable and computer-executable instructions may reside, for example, in non-transient data storage features such as storage devices 108, 110 of FIG. 1. Although specific operations are disclosed in flowcharts 300, 900, 1200, 1400, 1600, 1800, 1900 and 2000 and sequence diagrams 500 and 1500, such operations are examples. That is, embodiments are well suited to performing various other operations or variations of the operations recited in flowcharts 300, 900, 1200, 1400, 1600, 1800, 1900 and 2000 and sequence diagrams 500 and 1500. It is appreciated that the operations in flowcharts 300, 900, 1200, 1400, 1600, 1800, 1900 and 2000 and sequence diagrams 500 and 1500 may be performed in an order different than presented, and that not all of the operations in flowcharts 300, 900, 1200, 1400, 1600, 1800, 1900 and 2000 and sequence diagrams 500 and 1500 may be performed. Where helpful for the purposes of illustration and not for limitation, FIGS. 3, 5, 9, 12, 14-16 and 18-20 will be described with reference to the other figures, which illustrate hypothetical situations in which embodiments may be implemented.

Generally speaking, various embodiments provide mechanisms for creating a geo-spatial repository representing a retail store environment, for locating and tracking customers in a retail store environment, and then using the information learned to enhance the shopping experience for the customer, amongst other aspects.

Figure 2:
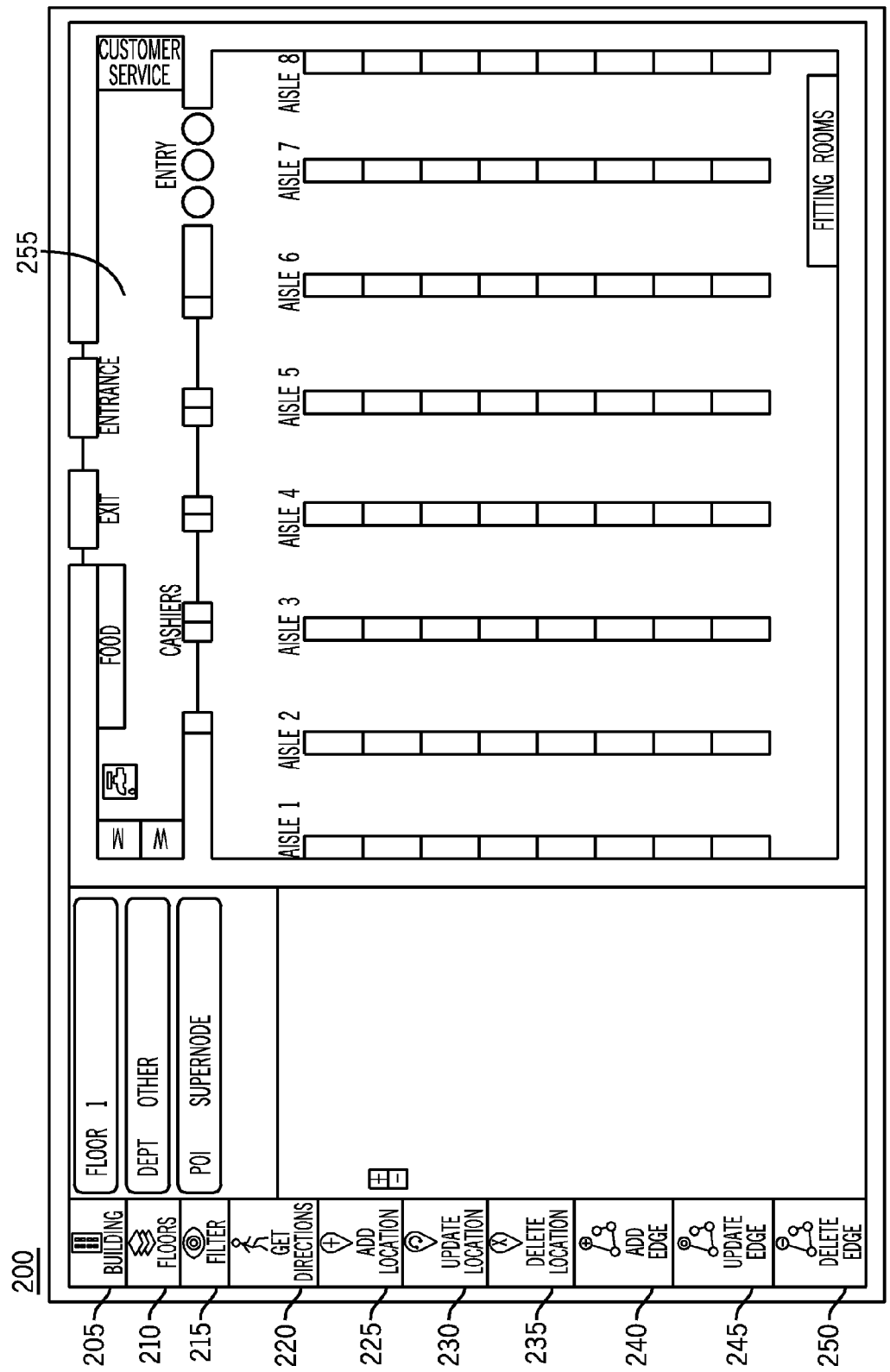
FIG. 2 shows a graphical user interface for building a geo-spatial repository, in accordance with various embodiments of the present invention.

FIG. 2 shows a graphical user interface (GUI) 200 for building a geo-spatial repository, in accordance with various embodiments of the present invention. The repository may be stored, for example, in a database that is part of or communicatively coupled with a web server. As shown, the GUI 200 provides the user with the ability to select from one or more buildings 205 and one or more floors 210 within a selected building. The GUI 200 also permits a user to filter 215 based on certain categories of points of interest, such as departments, restrooms, etc. The GUI 200 also includes a working space 255 for displaying the selected floorplan. A user may also use GUI to get directions 220 between two previously defined locations, or waypoints.

The GUI 200 also allows the user to perform various operations with respect to locations and edges within the repository. For the purposes of this discussion, an "edge" refers to a traversable path between two adjacent locations. However, it should be appreciated that every two adjacent locations may not necessary have an edge defined between them (e.g. when the edge would pass through a physical fixture). As shown, the GUI 200 provides the user with the ability to add a location 225, update a location 230, delete a location 235, add an edge 240, update an edge 245, and delete an edge 250.

Figure 3:
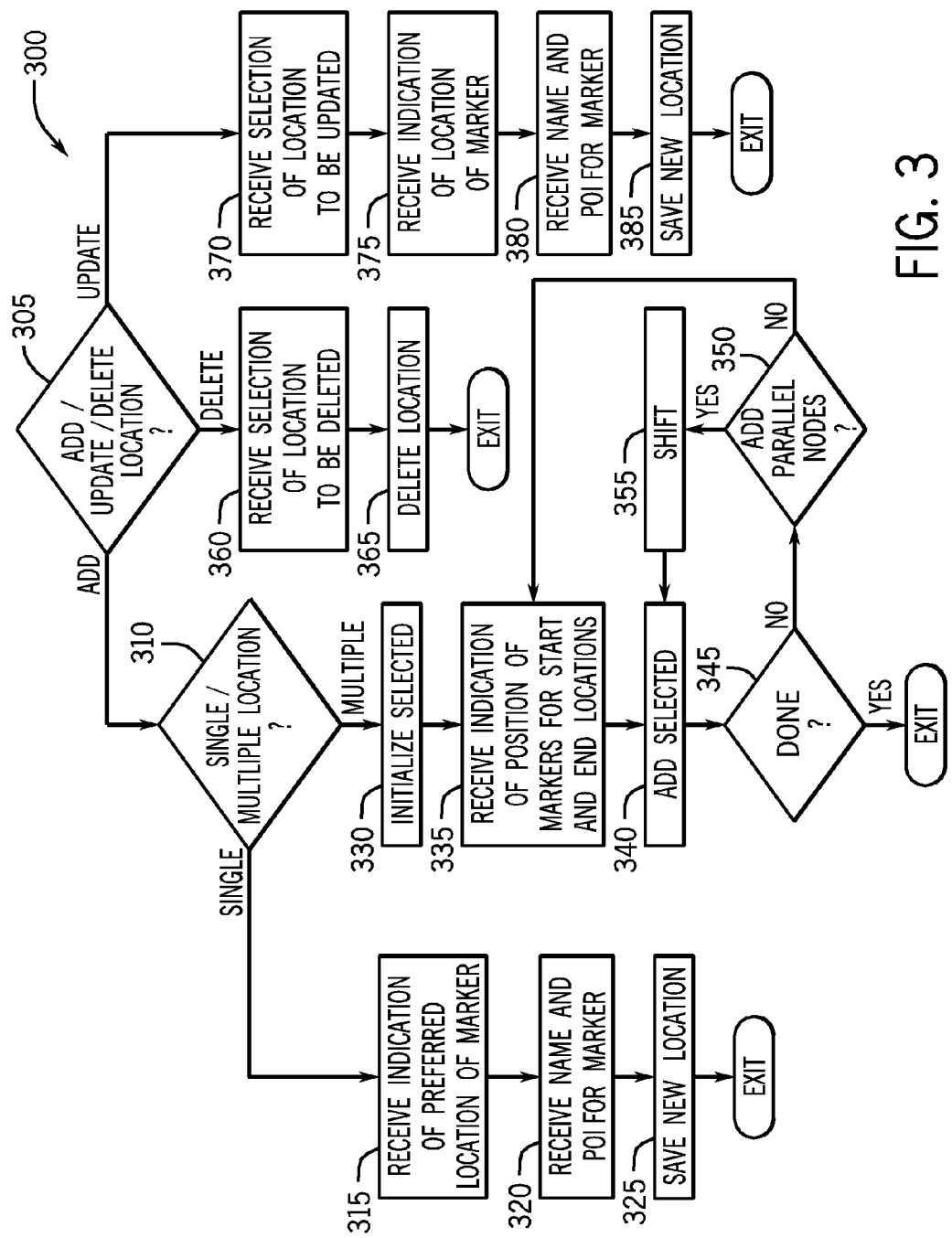
FIG. 3 illustrates a flowchart for adding, deleting and updating a location in an geo-spatial repository, in accordance with various embodiments of the present invention.

FIG. 3 illustrates a flowchart 300 for adding, deleting and updating a location in an geo-spatial repository, in accordance with various embodiments of the present invention. FIG. 3 will be described with reference to FIGS. 4 and 6-8, which illustrate screenshots of GUI 200 at various stages of the process.

Flowchart 300 begins at block 305, where a determination is made as to whether a request to add, update or delete a location has been received. This may be determined, for example, by detecting a selection of one of the add location 225, update location 230 or delete location 235 buttons. If the add location button 225 has been selected, flowchart 300 proceeds to block 310, where a determination is made as to whether a single location or multiple locations is/are being added. In one embodiment, the default is to add a single location; however, if a user selects "Initialize" (see also block 330), the GUI enters a multiple location mode.

Figure 4:
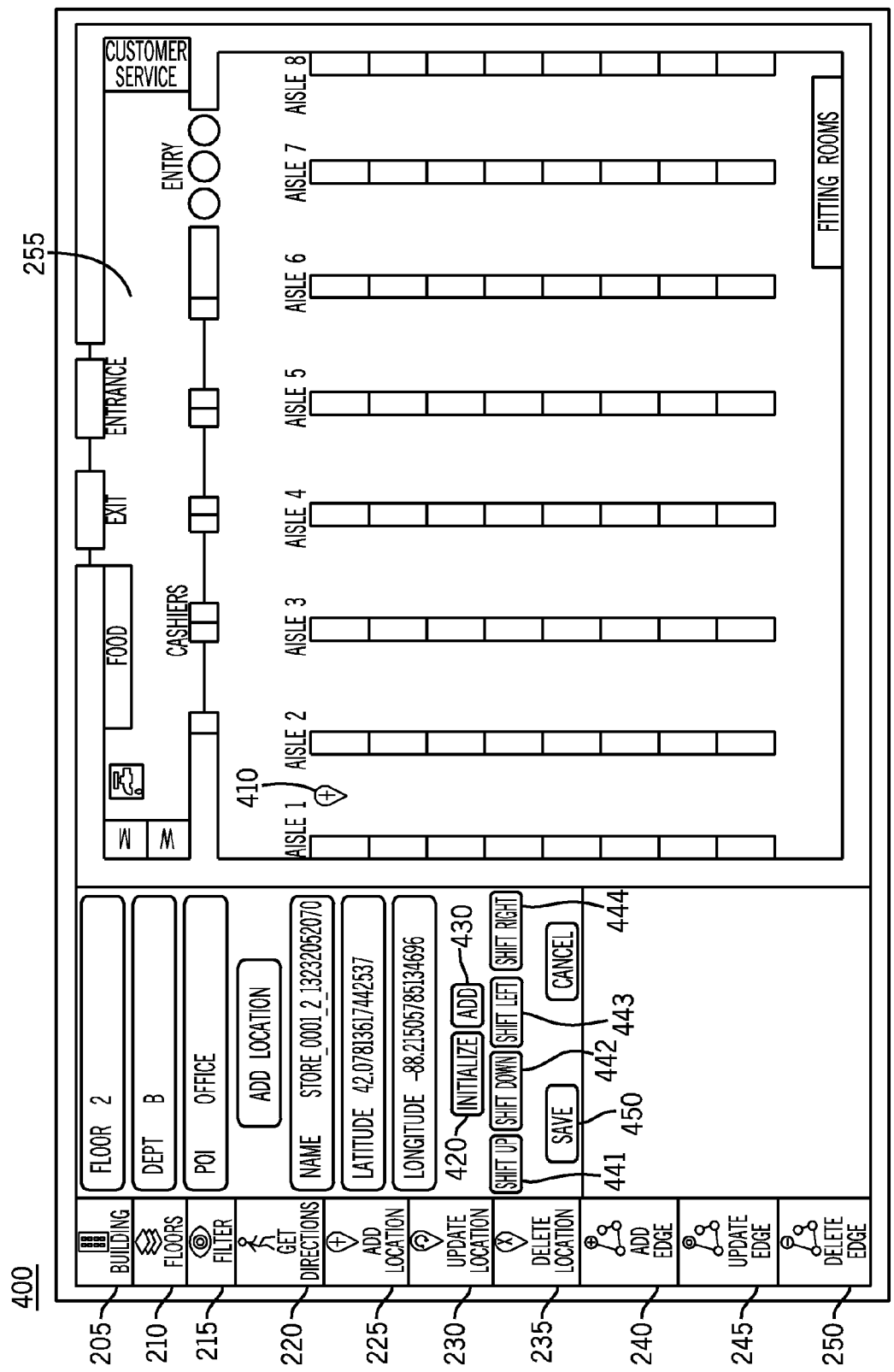
FIG. 4 is a screenshot of a graphical user interface for adding a waypoint to a geo-spatial repository, in accordance with various embodiments of the present invention.
Figure 5:
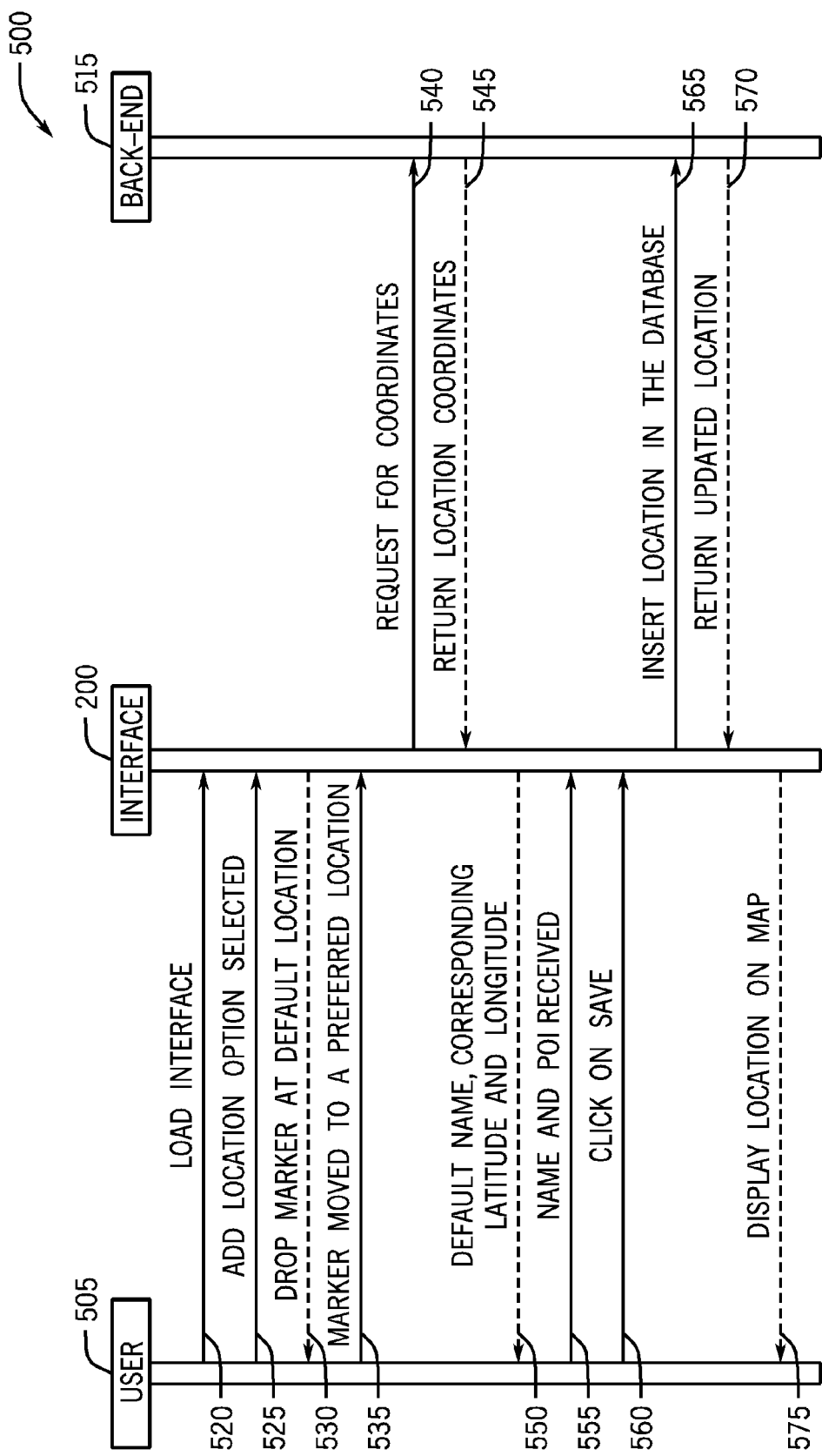
FIG. 5 illustrates a sequence diagram of an embodiment for adding a waypoint to a geo-spatial repository, in accordance with various embodiments of the present invention.

In the case where the user only intends to add a single location, flowchart 300 proceeds to block 315. Further supplementing the "add single location" aspect of flowchart 300, FIG. 5 illustrates a sequence diagram 500 of a more detailed embodiment for adding a location. Specifically, sequence diagram 500 shows the interaction between a user 505, an interface 200, and a back-end 515 (such as a geo-spatial repository). As shown, after the user loads the interface 200 (step 520) and selects the add location option 225 (step 525), the interface 200 drops a marker 410 down at a default location (step 530), as shown in FIG. 4. The user may then move the marker 410 to a desired location (block 315, step 535). After the marker 410 has been moved, the interface requests new coordinates from the back-end 515 (step 540) and the back-end 515 determines the new coordinates and returns them to the interface 200 (step 545). The interface 200 then displays the coordinates for the user 505, together with a default name (step 550). The user 505 may then optionally edit the name and point of interest (POI) description of the location (block 320, step 555). Once complete, the user 505 selects save 450 (step 560), and the new location is saved (block 325). In saving the location, the interface 200 inserts the location into the database of the back-end 515 (step 565), the back-end 515 returns the updated location to the interface 200 (step 570), and the interface 200 in turn displays the location on a map to the user 505.

Figure 6:
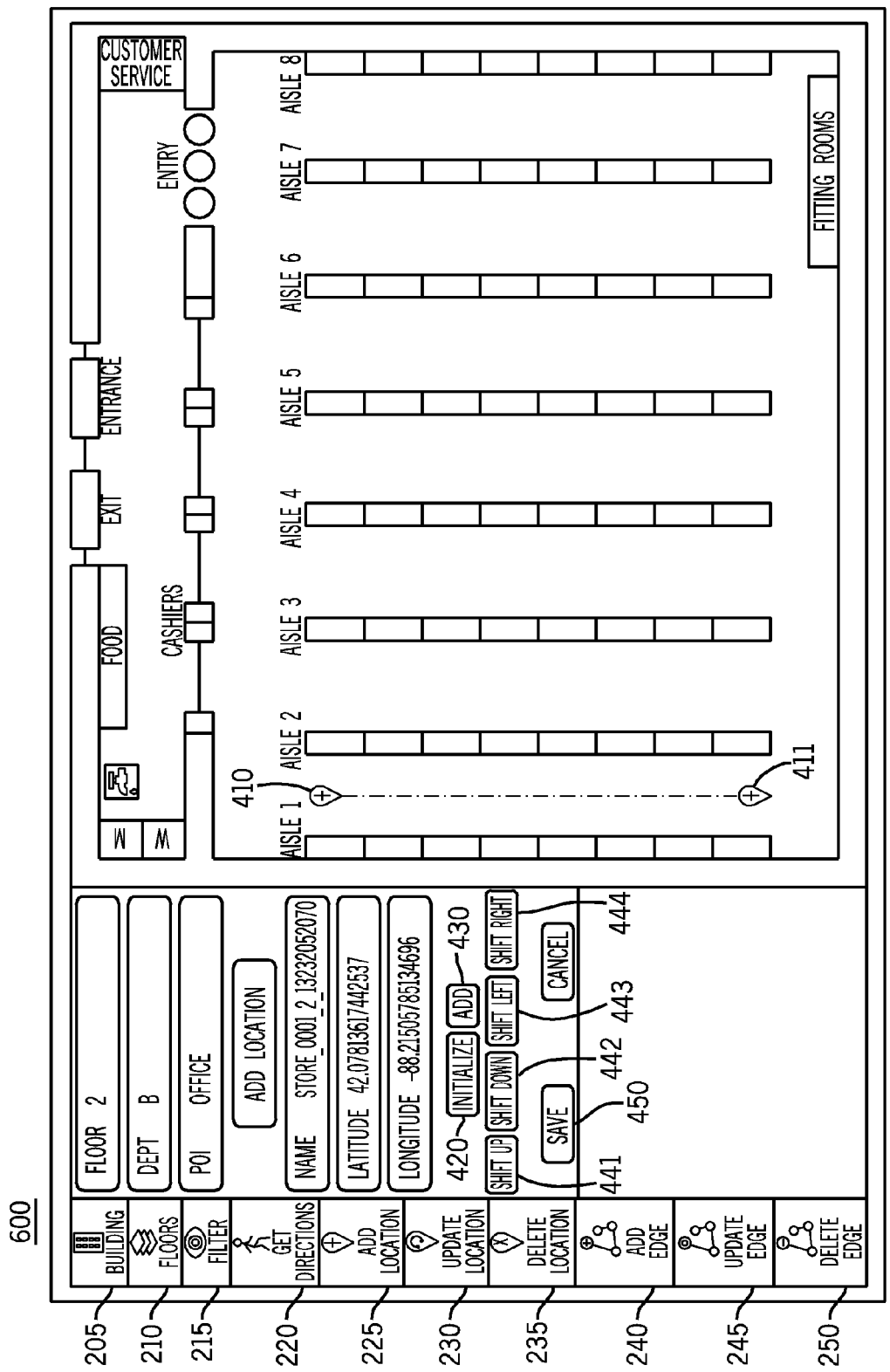
FIG. 6 is a first screenshot of a graphical user interface for adding a plurality of waypoints to a geo-spatial repository, in accordance with various embodiments of the present invention.
Figure 7:
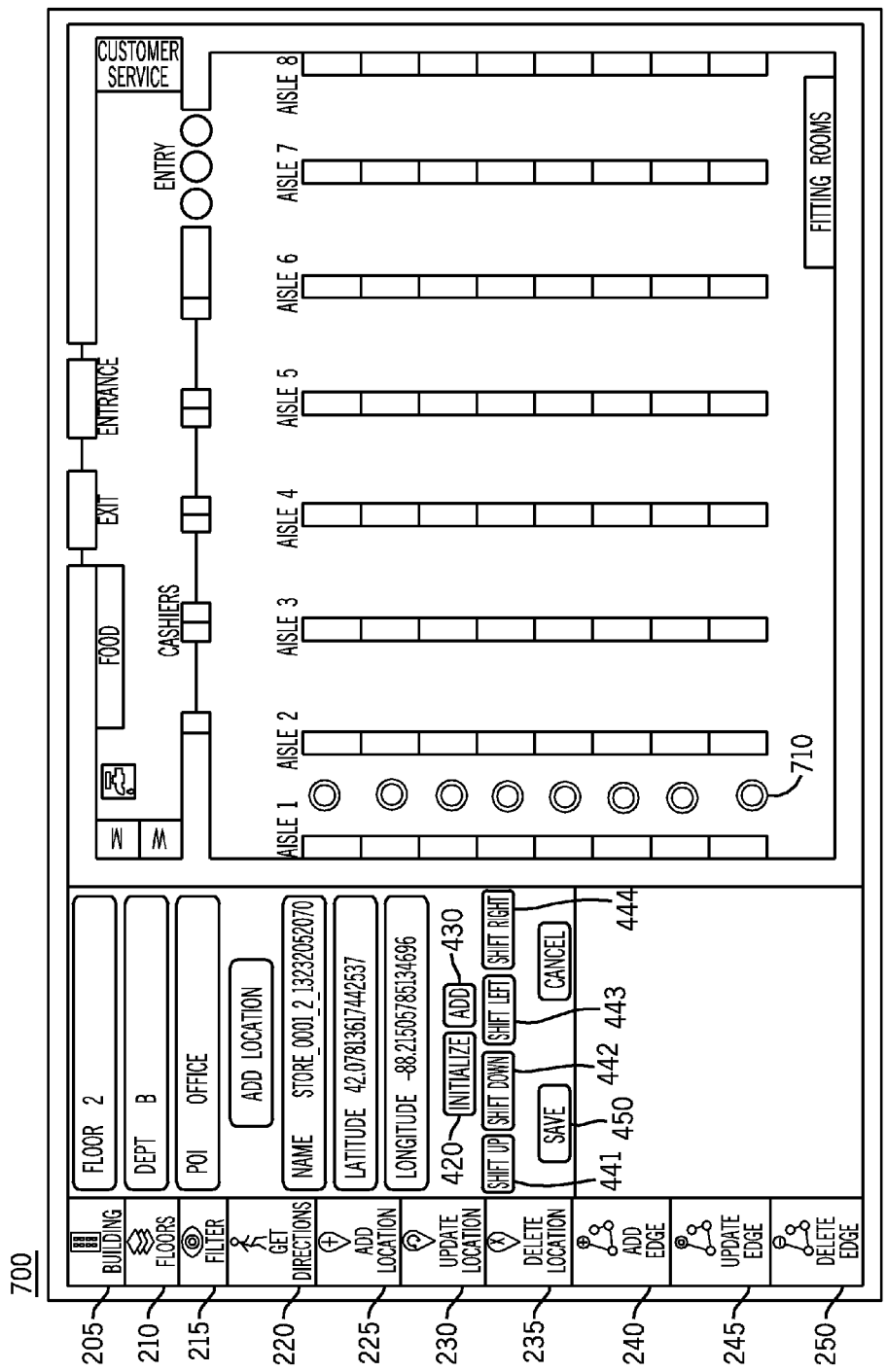
FIG. 7 is a second screenshot of a graphical user interface for adding a plurality of waypoints to a geo-spatial repository, in accordance with various embodiments of the present invention.

If the user selects "Initialize" to place the GUI 200 into a multiple location mode, the GUI 200 is configured to enable the selection of two endpoints, as shown in FIG. 6. Once the endpoints have been selected (block 335) and "Add" 420 has been selected (block 340), the interface 200 then converts endpoints into waypoints 710 and creates intermediate waypoints 710 between the endpoints, as shown in FIG. 7.

Figure 9:
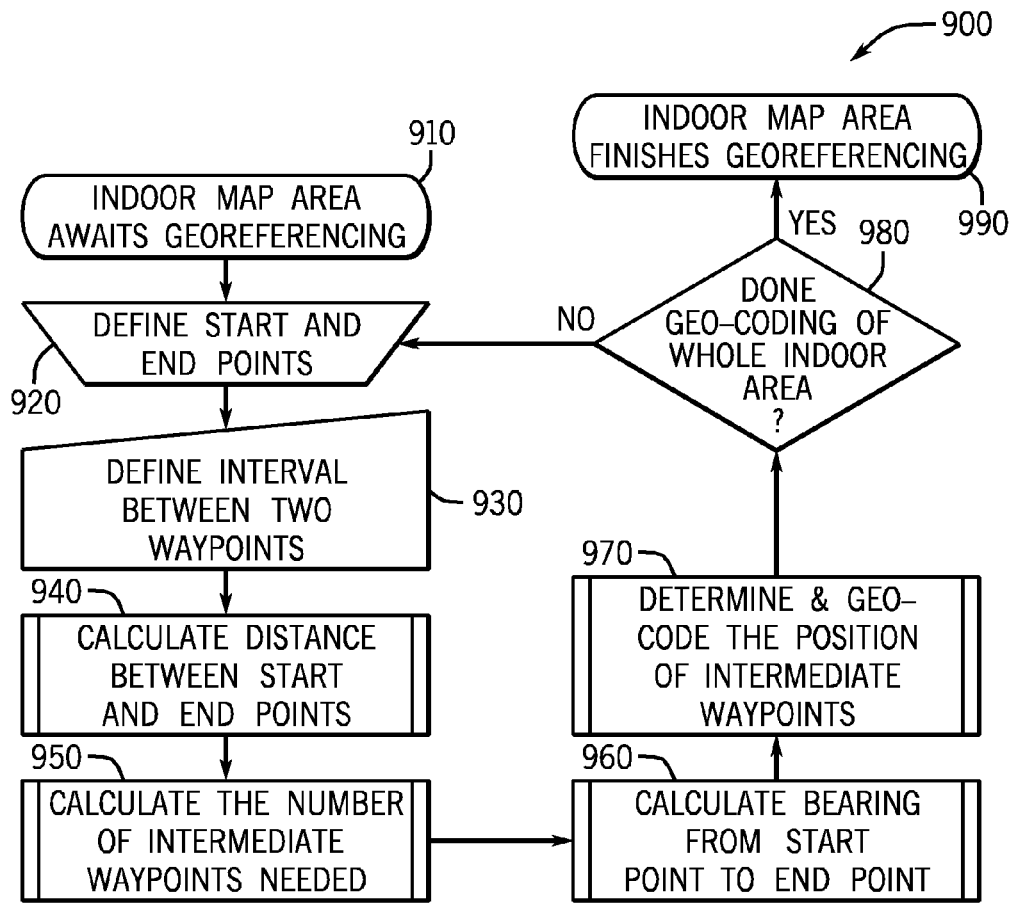
FIG. 9 illustrates a flowchart for a method of calculating intermediate map locations, in accordance with various embodiments of the present invention.

FIG. 9 illustrates a flowchart 900 for a method of calculating intermediate map locations, in accordance with an embodiment. As described with reference to FIG. 3, the map initially awaits georeferencing (block 910), and a user then defines start and end points (block 920). Once the endpoints have been defined, an interval between waypoints is defined (block 930). This may be based, for example, on a default value, or it may be entered by a user. A back-end may then calculate the distance between the start and end points (block 940) and then calculate the number of intermediate waypoints needed based on the distance calculated in block 940 and the defined waypoint interval (block 950). The back-end may then calculate a bearing between the start and end points (block 960) and determine and geo-code the position of the intermediate waypoints (block 970). This may be achieved, for example, by evenly spacing intermediate waypoints along the bearing at distances equal to or less than the defined interval (see FIG. 7). At block 345 of FIG. 3 and block 980 of FIG. 9, a determination is made as to whether the process of adding multiple locations or waypoints is complete. If it is, the process exits. If not, the preceding process may be repeated.

Figure 8:
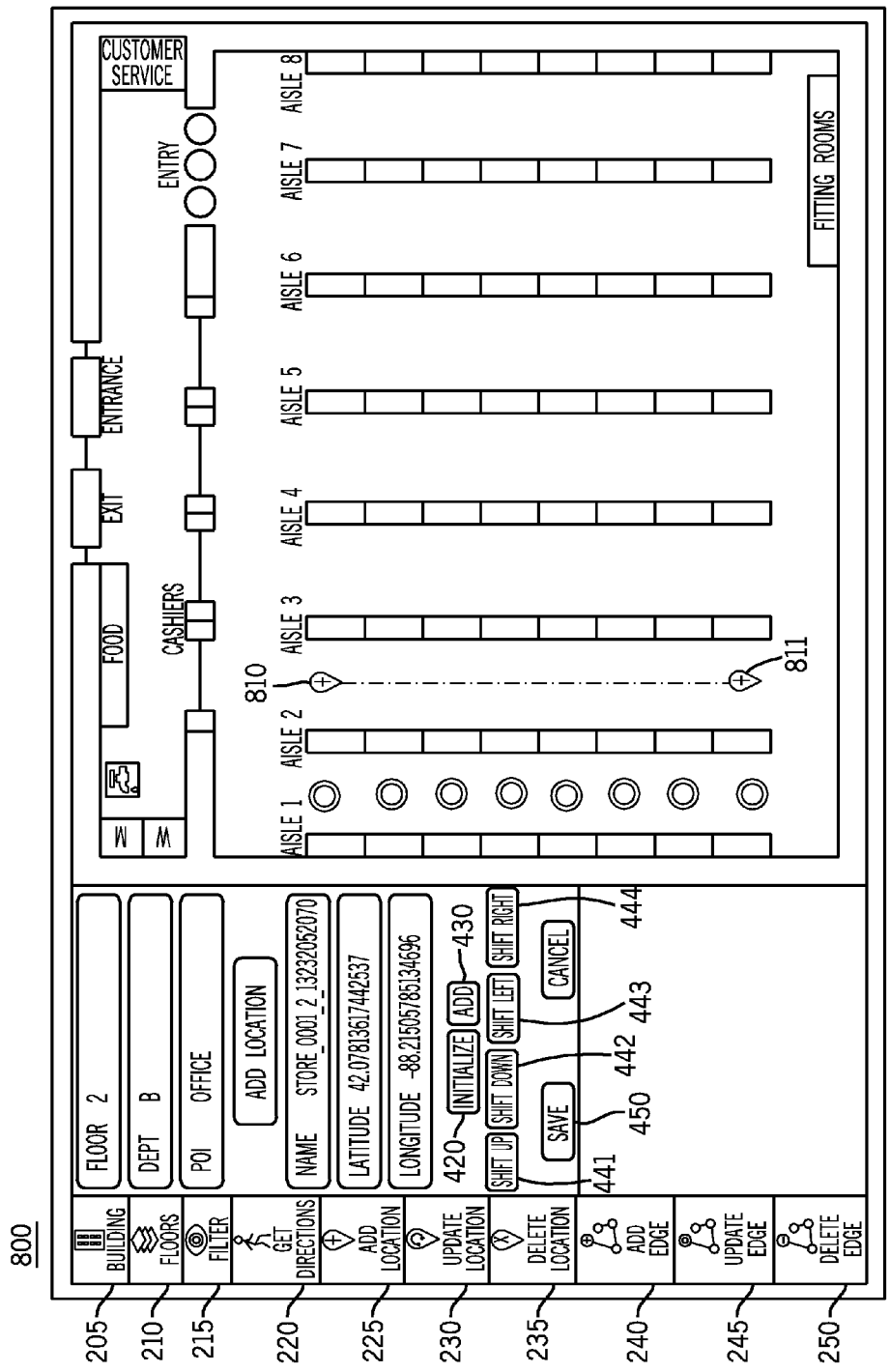
FIG. 8 is a screenshot of a graphical user interface for adding a parallel set of waypoints to a geo-spatial repository, in accordance with various embodiments of the present invention.

Various embodiments may enable a user to conveniently replicate parallel rows of waypoints, thereby significantly reducing the time needed to georeference a given space. With reference again to FIG. 3, after a determination is made that the process is not complete (block 345), a further determination may be made (at block 350) as to whether parallel nodes (i.e. waypoints) are to be added. This determination may be made by detecting whether one of the Shift Up 441, Shift Down 442, Shift Left 443 and Shift Right 444 buttons have been selected. If not, then flowchart 300 returns to block 335, where the user may continue to manually enter another row of waypoints. If one of the Shift keys (e.g. Shift Right 444) has been selected, then the interface may insert a parallel, "shifted" set of endpoints (block 355) in the direction indicated (e.g. right), as shown in FIG. 8. The user may continue to "nudge" the new endpoints by successively selecting the appropriate Shift button 441-444.

Returning again to block 305, if a determination is made that a request to delete a location has been received, flowchart 300 proceeds to block 360, where a selection of a location to be deleted is received. In response, the selected location is deleted from the map (block 365), and the process exits.

If a determination is made at block 305 that a request to update a location has been received, flowchart 300 proceeds to block 370, where a selection of a location to be updated is received. Once the location to be updated has been selected, the user may move the corresponding marker and/or edit the corresponding name and POI. Accordingly, an indication of an updated location of the marker may be received (block 375), and an updated name and/or POI may be received (block 380). The information received in blocks 375 and 380, if any, is then saved at block 385, and the process exits.

Figure 10:
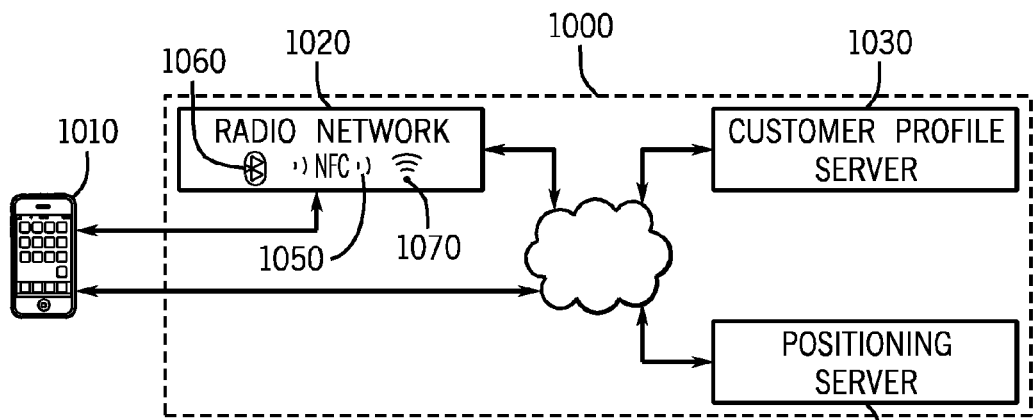
FIG. 10 illustrates a block diagram an indoor positioning system, in accordance with various embodiments of the present invention.

Once the geo-spatial repository has been built, with maps, waypoints and edges defined, it may then be utilized as part of an indoor positioning system. FIG. 10 illustrates an example of such an indoor positioning system 1000. On the front end, system 1000 includes a radio network 1020 for communicating with a portable device 1010, such as a smartphone, a tablet, a laptop, or the like, running an application adapted to interface with one or more components of system 1000. The radio network 1020 includes a plurality of spaced, short-range, radio network nodes. The radio network nodes may be WiFi (i.e. 802.11) nodes 1070 and/or Bluetooth nodes 1060 (e.g. Bluetooth Low Energy network nodes), but are not limited as such. The radio network also includes one or more Near Field Communication (NFC) nodes 1050, which may be placed into communication with the portable device 1010 when the device is "tapped" or "bumped" (i.e. brought into close proximity with) the NFC nodes 1050.

On the back end, system 1000 includes a positioning server 1040 communicatively coupled with the radio network 1020 and, optionally, the portable devices 1010, for determining the position of one or more portable devices 1010 on the radio network 1020 and/or one or more products in the store. To that end, positioning server 1040 may include a database of information concerning products available in a given store, as well as their locations. In particular, when the radio network nodes 1060, 1070 are in communication with a portable device 1010, they may measure their respective signal strength to the portable device 1010 and then provide that information to the positioning server 1040. The positioning server 1040 may then use the collected signal strength information to determine the position of the portable device 1010. The positioning server 1040 can provide an updated location of the portable device 1010 after a predetermined time interval or when the portable device 1010 moves a predetermined distance.

The NFC nodes 1050 can also be used to supplement the positioning data gathered by the radio network nodes 1060, 1070. Specifically, since NFC nodes 1050 have such extremely short ranges (e.g. 4 cm or less), when an NFC node 1050 comes into communication with a portable device 1010, the positioning server 1040 can simply assume that the location of the portable device 1010 is the same as the already-known location of the NFC node 1050. In this regard, when a portable device 1010 is tapped against an NFC node 1050, the positioning server 1040 can dynamically calibrate itself by comparing the actual location of the portable device 1010 (i.e. the location of the tapped NFC node 1050) with the location of the portable device 1010 calculated from the signal strengths received from the radio network nodes, and adjust an error value accordingly.

System 1000 may also include a customer profile server 1030 communicatively coupled with the positioning server 1040, the radio network 1020 and, optionally, the portable device 1010. While FIG. 10 depicts the customer profile server 1030 as being separate from the positioning server 1040, it should be appreciated that the functions of customer profile server 1030 and positioning server 1040 may be implemented together in single server or, alternatively, in a clustered computing (i.e. cloud) environment. Customer profile server 1030 may include one or more databases of user profiles in which at least one of the profiles is associated with the portable device 1010. For example, portable device 1010 may be running an application that permits a user to log into customer profile server 1030 and/or positioning server 1040 with login credentials associated with the user account. In association with a given user account, the customer profile server 1030 may store various types of information, including but not limited to the customer's demographic information, contact information and shopping habits (both online and offline).

System 1000 therefore enables a customer using a portable device 1010 to track their location within a store and search for the location of a desired product, including receiving directions to the desired product. In this regard, a customer may utilize her portable device 1010 to access customer profile server 1030 and positioning server 1040—either directly or indirectly through radio network 1020—to determine her location within a store and to search for a desired product. To that end, positioning server 1040 may provide portable device 1010 with a graphical representation of the floorplan of the subject store, together with an indication of the customer's current location within the floorplan. Moreover, a customer may use her portable device in communication with the customer profile server 1030 to search for a desired product within the store. In response thereto, the positioning server 1040 may provide the portable device 1010 with a graphical representation of the location of the desired product. The positioning server 1040 may also calculate a route between the portable device 1010 and the desired product and provide the route to the portable device 1010. The route may be provided in the form of a graphical overlay on a map of the store and/or turn-by-turn directions. The positioning server 1040 may also provide the portable device 1010 with additional information concerning the product, including but not limited to a description of the product, a price, reviews of the product, images of the product, and the like.

The customer profile server 1030 and the positioning server 1040 may also interact in other ways that likewise enrich a customer's shopping experience. For example, the customer profile server 1030 may receive the indication of the desired product from the portable device 1010 and the location of the portable device 1010 from the positioning server 1040 or the device 1010 itself and, in response thereto, provide the portable device 1010 with a promotional offer. The selection of the promotional offer may be based upon the desired product, the location of the portable device, a combination thereof, as well as other factors. For example, in one embodiment, the customer profile server 1030 may provide the portable device 1010 with the promotional offer only after the portable device 1010 has been in the same location for a predetermined period of time—suggesting that the customer is interested in a product in that particular location.

The customer profile server 1030 may also receive periodic updates from the portable device 1010 and/or the positioning server so as to update the customer's user profile to include the customer's offline (i.e. in-store) shopping habits. In addition to the customer's offline shopping habits, the customer's user profile may also include information concerning the customer's online shopping habits. The customer profile server 1030 may then provide the customer's portable device 1010 with a promotional offer based on a combination of the customer's online and offline shopping habits.

The customer profile server 1030 may also notify a store customer service agent, e.g. through a second portable device 1010 associated with the agent, after the customer's portable device 1010 has been in the same location for a predetermined amount of time. In so doing, the customer profile server 1030 may provide the agent with information which may include, but is not limited to, the desired product, the location of the customer's portable device 1010, all or part of the customer's user profile. Additionally, or alternatively, the customer profile server 1030 may send a notification to the agent upon receipt of a request for assistance from the customer's portable device 1010.

Figure 11:
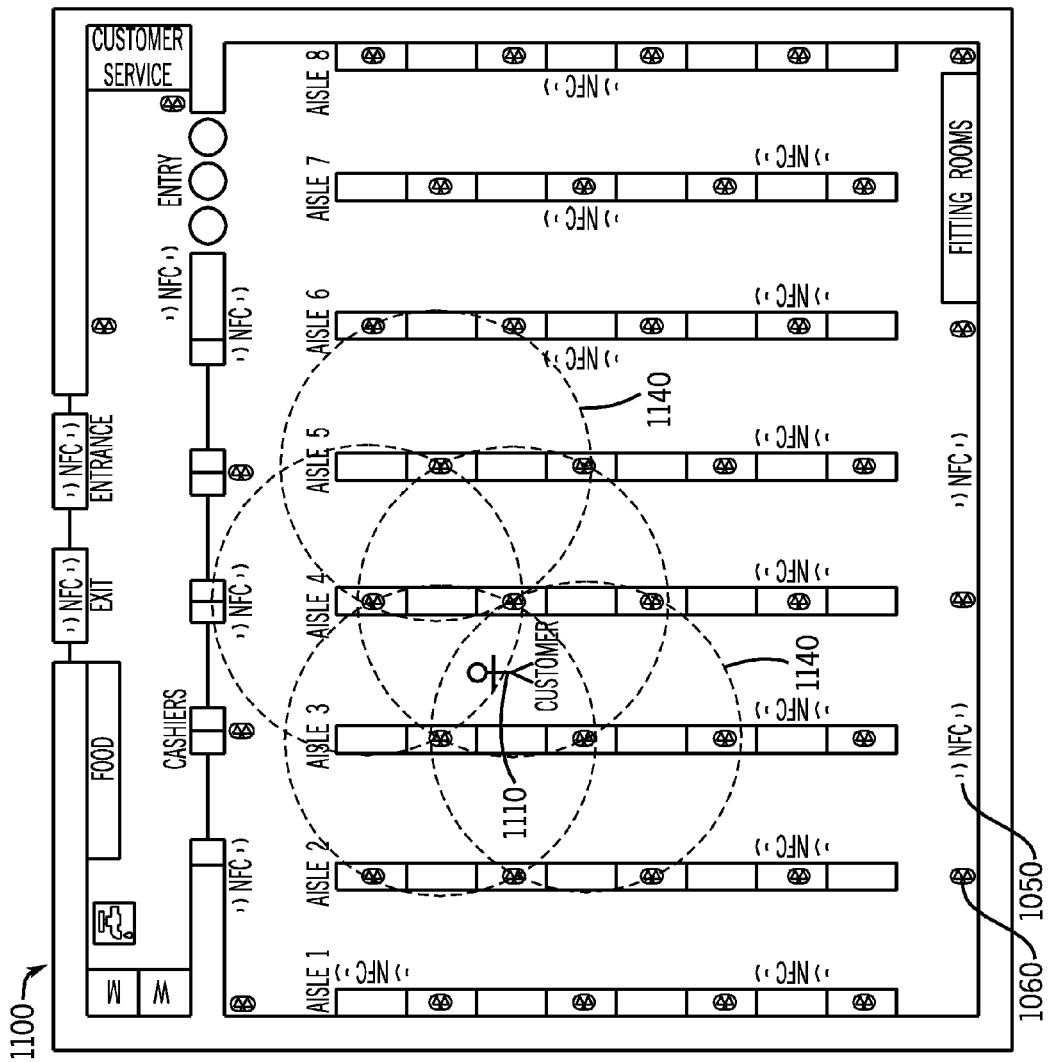
FIG. 11 is a floorplan showing an exemplary arrangement of radio network, in accordance with an embodiment various embodiments of the present invention.

Referring to FIG. 11, an exemplary arrangement 1100 of radio network, in accordance with an embodiment, is illustrated. In the illustrated embodiment, the radio network nodes (shown in FIG. 11 as Bluetooth nodes 1060) are arranged throughout the store so that the coverage radii 1140 of at least three, and preferably four, nodes 1060 overlap. Further, the radio network nodes may be arranged in different vertical planes so as to enable geo-location in three dimensions. The NFC nodes 1050 may also be arranged at strategic locations throughout the store so that customers can easily access them when needed. For example, the NFC nodes 1050 may be located at or near entrances, exits, cashiers, fitting rooms and aisles. Thus, and as discussed in more detail below, when a customer first enters the store, she can tap her portable device 1010 against an NFC node 1050 (e.g. near the entrance), and the NFC node 1050 may then provide the portable device 1010 with configuration information to enable it to communicate and/or pair with the radio network nodes (e.g. Bluetooth nodes 1060).

Figure 12:
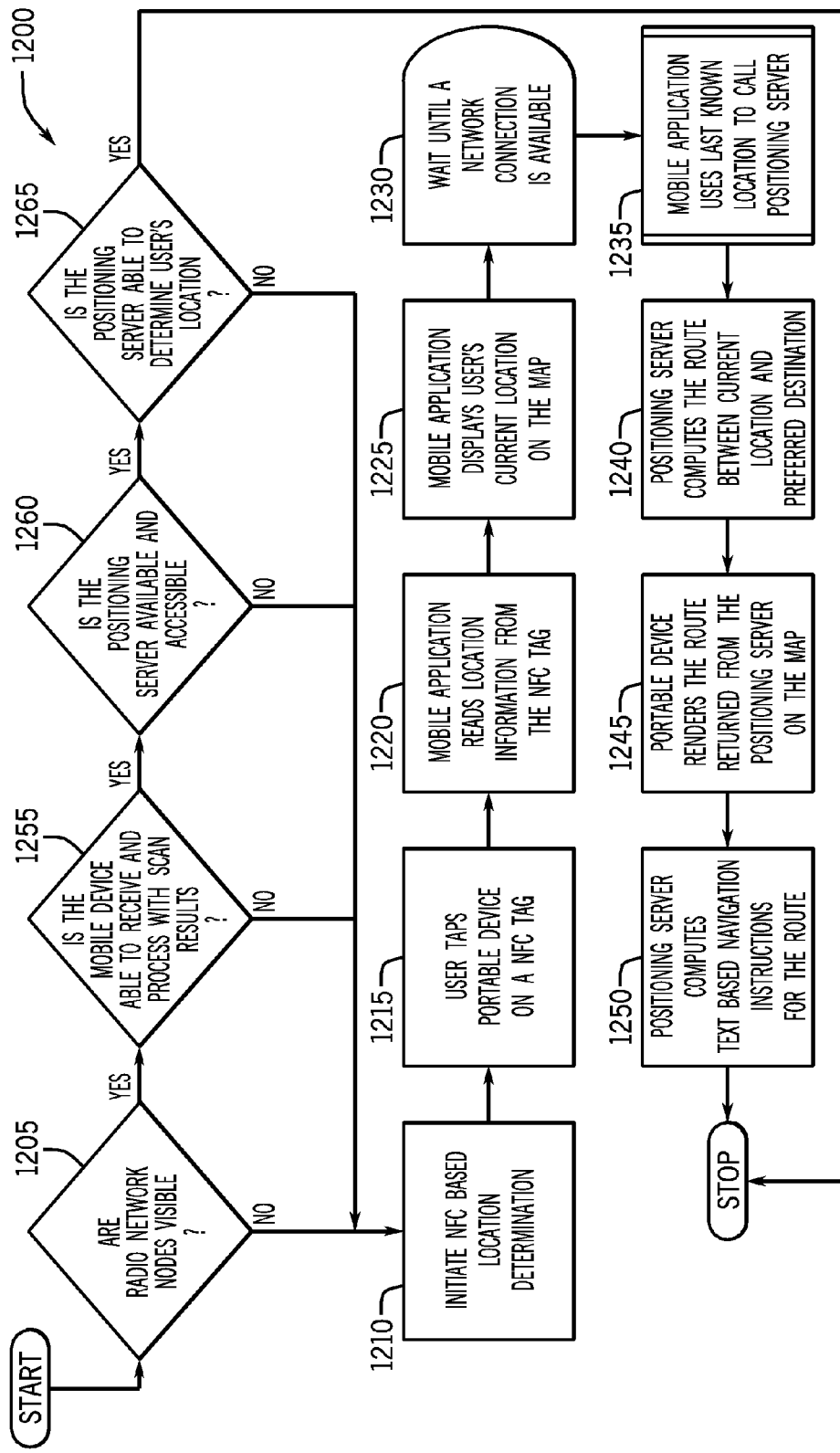
FIG. 12 illustrates a flowchart for using an near field communication node to supplement a positioning process, in accordance with various embodiments of the present invention.

FIG. 12 illustrates a flowchart 1200 for using an NFC node 1050 to supplement a positioning process, in accordance with various embodiments of the present invention. At block 1205, a determination is made as to whether any radio network nodes 1060, 1070 are visible. If not, flowchart 1200 proceeds to block 1210, where NFC-based location determination is initiated. At block 1215, the user taps her portable device 1010 against an NFC tag 1050. In response, a mobile application running on the portable device 1010 reads location information from the NFC tag 1050 (block 1220) and displays the user's current location on a map (block 1225). The mobile application then waits until a network connection is available (block 1230) and, once available, sends its last known location to the positioning server 1040 (block 1235). At block 1240, the positioning server 1040 then computes the route between the current location of the portable device 1010 and the preferred destination (e.g. the location of the desired product) and provides the route to the portable device 1010. The portable device then renders the route provided by the positioning server 1040 (block 1245). The positioning server 1040 may also compute and provide text-based (i.e. turn-by-turn) navigation instructions for the route (block 1250), which the portable device 1010 may in turn display.

Figure 13:
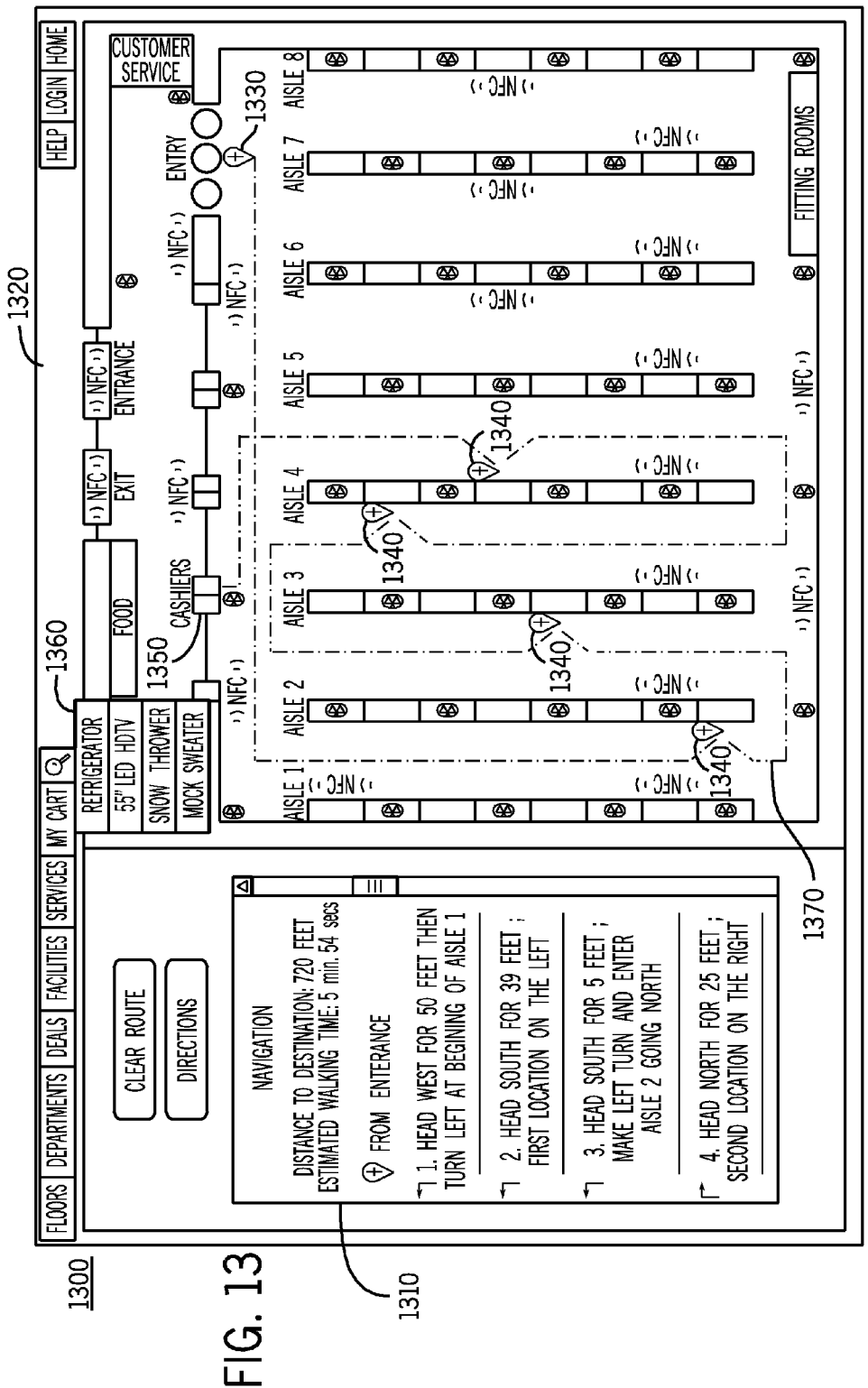
FIG. 13 illustrates an exemplary interface for routing a path through a store to pick up a plurality of products, in accordance with various embodiments of the present invention.
Figure 14:
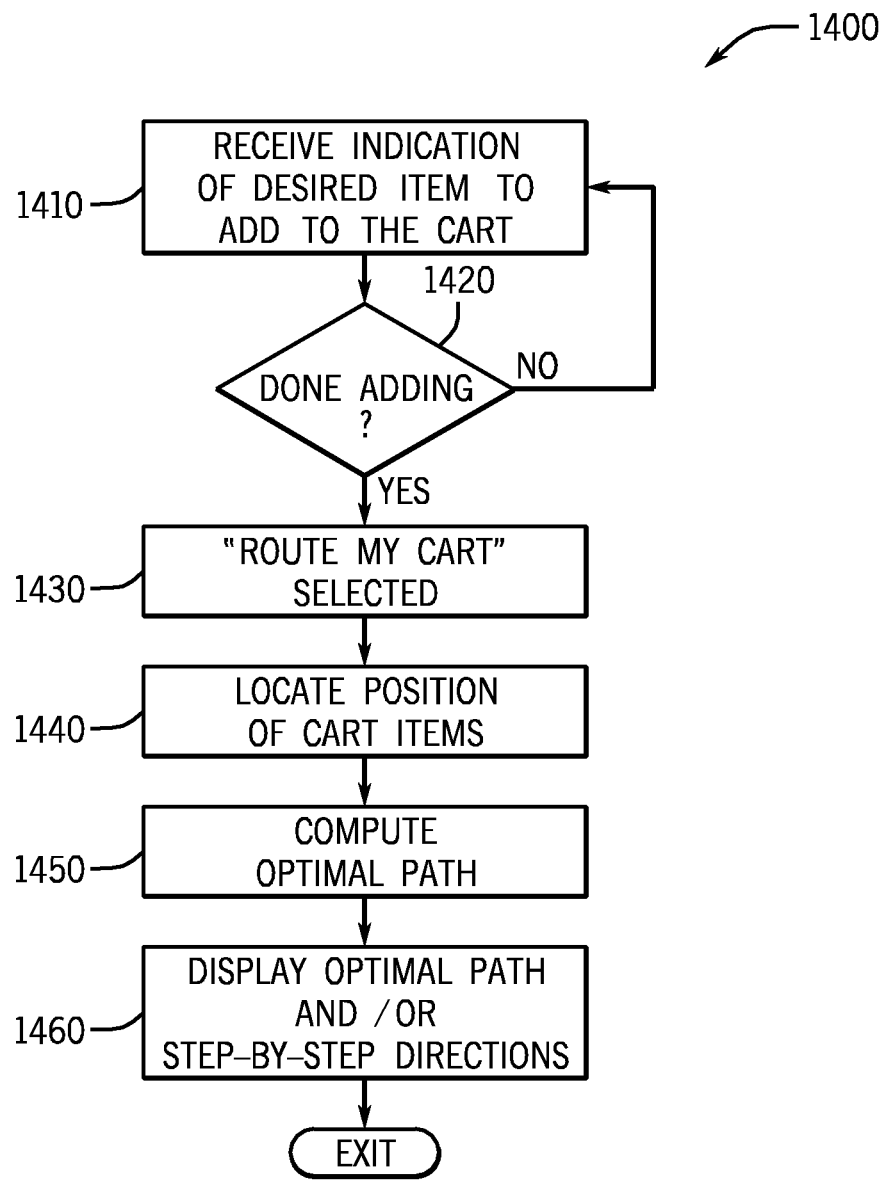
FIG. 14 illustrates a flowchart for a process for routing a virtual shopping cart, in accordance with various embodiments of the present invention.

As discussed above, system 1000 enables a customer to use to a portable device 1010 in cooperation with system 1000 to search for and route a path to a particular product. Moreover, a customer my use system 1000 to plot a route to a plurality of products (e.g. a shopping list). FIG. 13 illustrates an exemplary interface 1300 for routing a path through a store to pick up a plurality of products, in accordance with various embodiments. As shown, interface 1300 includes a map portion 1320 that displays a floorplan of a given store, with a route 1370 mapped out between a customer's current location 1330 and a cashier 1350, with several waypoints 1340 plotted along the way—each corresponding to a particular product in the customer's virtual shopping cart 1360. The customer may also be provided with textual, turn-by-turn directions 1310. The customer and system 1000 may build such a route on the fly, i.e. while the customer is at the store. Alternatively, the customer can browse elsewhere online, save a selection of items to a virtual shopping cart associated with the customer's user account, and then some time later use her portable device 1010 to access her virtual shopping cart and pull up a route for the selected items. FIG. 14 illustrates a flowchart 1400 for a process for routing a virtual shopping cart, in accordance with various embodiments of the present invention. At block 1410, customer profile server 1030 receives an indication of a desired item to add to the virtual shopping cart. At block 1420, a determination is made as to whether the customer is finished adding items to the cart. This may be accomplished by detecting the selection of a "done" or "finished" option, for example. If the customer is not finished adding items, then flowchart 1400 returns to block 1410. Otherwise, flowchart 1400 proceeds to block 1430, where, at some time later, the option to "Route My Cart" is selected. The customer profile server then calls up the customer's virtual shopping cart and works with the positioning server to obtain the locations of the items in the cart (block 1440), compute an optimal path (block 1450), and then provide the optimal path and/or step-by-step directions to the customer's portable device 1010 for display (block 1460).

Figure 15:
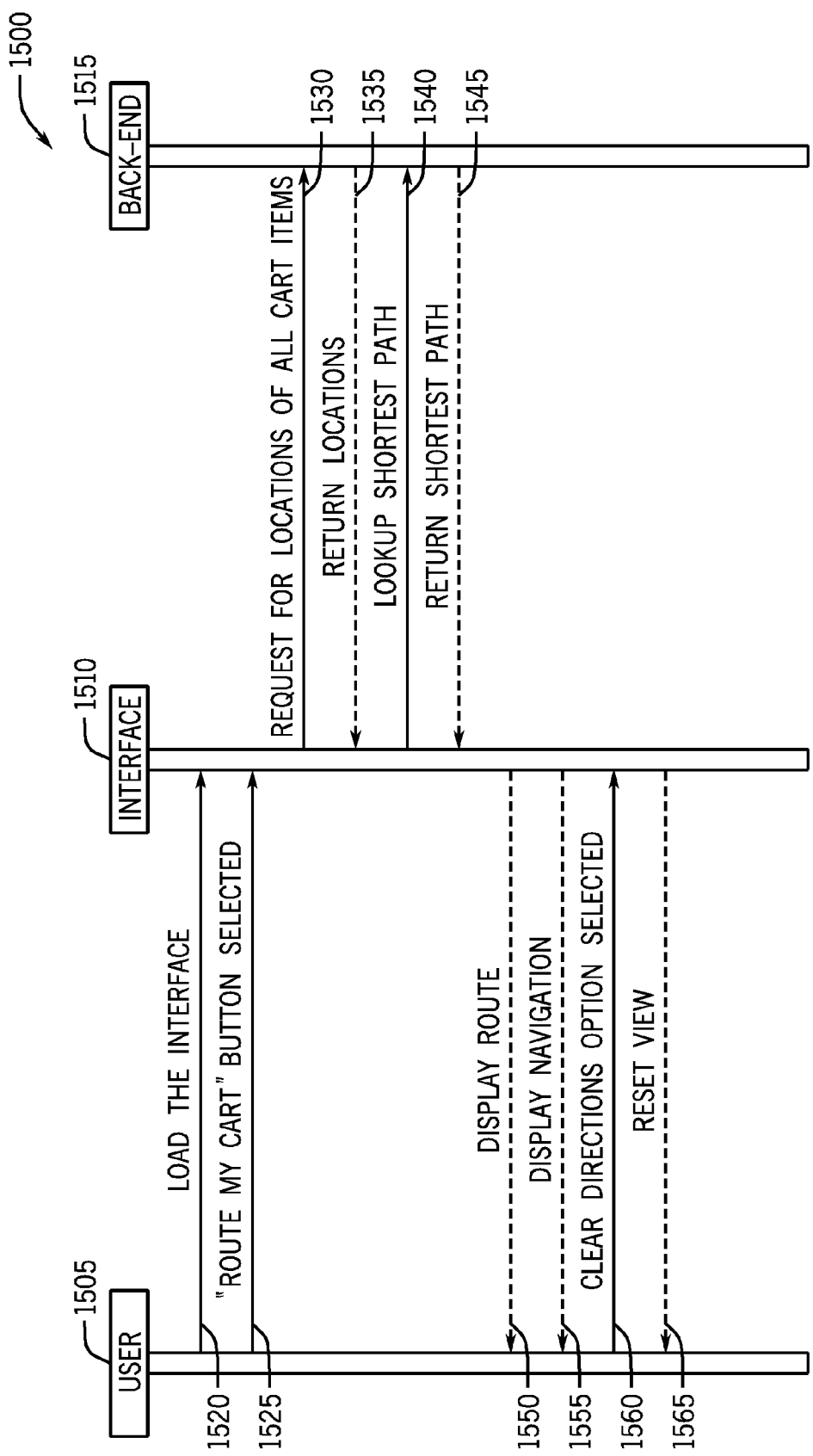
FIG. 15 illustrates a sequence diagram of an embodiment for routing a virtual shopping cart.

Further supplementing flowchart 1400, FIG. 15 illustrates a sequence diagram 1500 of a more detailed embodiment for routing a virtual shopping cart. Specifically, sequence diagram 1500 shows the interaction between a user 1505, an interface 1510 (such as a mobile application running on a portable device 1010), and a back-end 1515 (such as customer profile server 1030 and positioning server 1040). As shown, after the user loads the interface 1510 (step 1520) and selects the "Route My Cart" option (step 1525), the interface 1510 requests the locations of the cart items from the back-end 1515 (step 1530). In response, the back-end 1515 determines and returns the requested locations (step 1535). The interface 1510 then looks up the shortest path with the back-end 1515 (step 1540), and the back-end accordingly returns the shortest path (step 1545). The interface 1510 then displays the route (step 1550) and the turn-by-turn navigation (step 1555) to the user 1505. Once complete, the user 1505 has the option of clearing the directions. In response to the user 1505 selecting the clear directions option (step 1560), the interface 1510 resets the view (step 1565).

Figure 16:
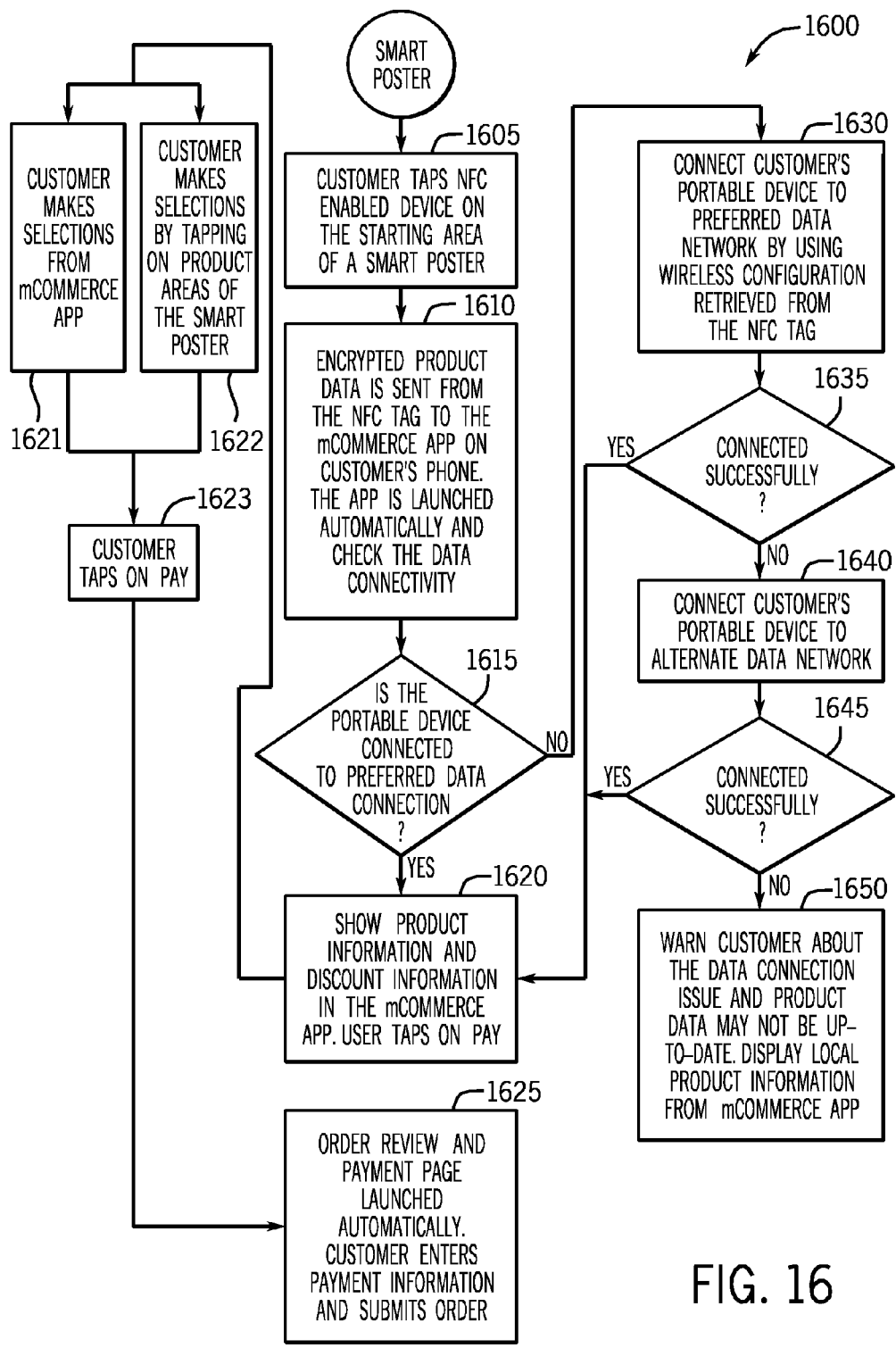
FIG. 16 illustrates a flowchart for a smart poster interaction process, in accordance with various embodiments of the present invention.

As discussed above, various embodiments utilize NFC technology as part of a geo-positioning system. However, as will become apparent from the following discussion, NFC nodes may be utilized in other ways to further enrich the shopping experience. For example, NFC-based "smart posters" may be used in place of signage that otherwise relies on the use of QR codes to invite multimedia interaction from a customer. FIG. 16 illustrates a flowchart 1600 for a smart poster interaction process, in accordance with various embodiments. Flowchart 1600 will be described in conjunction with FIG. 17, which illustrates an example of an NFC-based smart poster 1700—specifically, a smart poster 1700 for a hypothetical Mexican restaurant. At block 1605, the customer taps her NFC-enabled portable device 1010 on the starting area 1710 of the smart poster 1700. At block 1610, the NFC tag of the start area 1710 sends encrypted product data to the mobile commerce ("mCommerce") application on the customer's portable device 1010. If the app is not already running, it is launched automatically and checks for network connectivity. At block 1615, a determination is made as to whether the portable device 1010 is connected to the preferred data connection (e.g. radio network 1020). If it is, then flowchart 1600 proceeds to block 1620, where the mCommerce app displays product information and discount information. The customer then has the option of selecting items for purchase by either making selections from the mCommerce app on the portable device 1010 (block 1621) or by tapping on product areas 1720 of the smart poster 1700 (block 1622). When the customer is finished making selections, she can tap on the pay area 1730 of the smart poster 1700 (block 1623). In response, an order review and payment page is automatically launched in the mCommerce app, wherein the customer enters payment information and submits the order.

Returning again to block 1615, if it is determined that the portable device 1010 is not connected to the preferred data connection, flowchart 1600 proceeds to block 1630, where the customer's portable device 1010 is connected to the preferred data network by using wireless configuration information received from the NFC tag 1710. At block 1635, a determination is made as to whether the portable device has been successfully connected to the preferred data network. If it has, then flowchart 1600 proceeds to block 1620 (discussed above). If not, then flowchart 1600 proceeds to block 1640, where the customer's mobile device 1010 is connected to an alternate data network (e.g. a cellular data network). At block 1645, a determination is made as to whether the portable device has been successfully connected to the alternate data network. If it has, then flowchart 1600 proceeds to block 1620 (discussed above). If not, then flowchart 1600 proceeds to block 1650, where the customer is warned about the data connection issue and that product information on the mCommerce app therefore may not be up to date, and the local product information stored in the mCommerce app is displayed.

Figure 17:
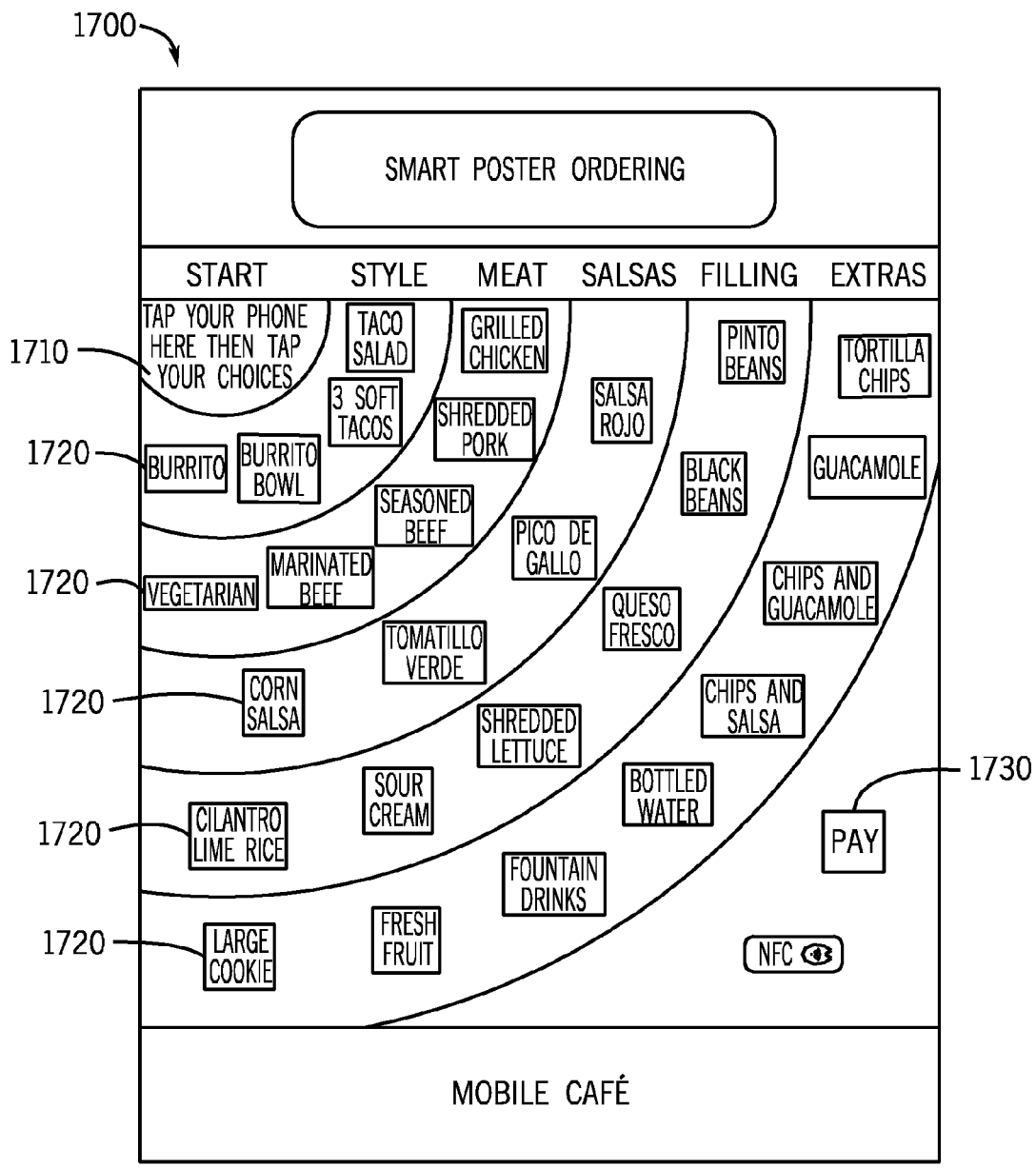
FIG. 17 illustrates an example of an NFC-based smart poster, in accordance with various embodiments of the present invention.
Figure 20:
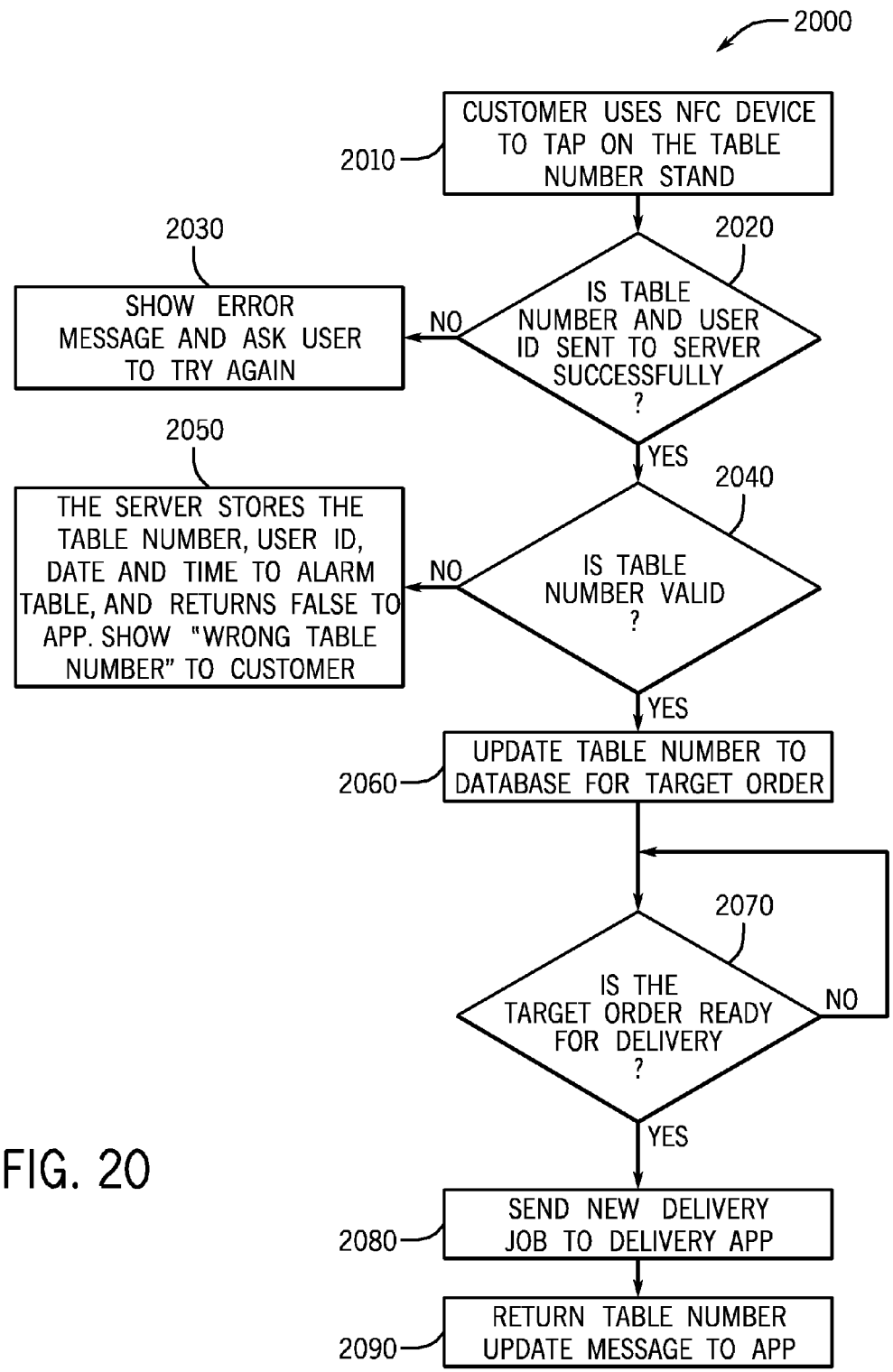
FIG. 20 illustrates a flowchart of a process for linking a table with a food order using an NFC node, in accordance with various embodiments of the present invention.

In a restaurant setting, such as that described with respect to FIG. 17, NFC nodes may be further utilized in other aspects of the workflow, such as tableside food delivery. For example, some restaurants provide a customer with a number to display on the table of their choice. When the customer's food is ready, a server then wanders around the dining room looking for the number associated with the order. As a more convenient alternative, FIG. 20 illustrates a flowchart 2000 of a process for linking a table with a food order using an NFC node, in accordance with an embodiment. At block 2010, the customer taps her NFC-enabled portable device against a table number stand associated with a particular. In response, the table number and a user identifier (i.e. linked to the customer's order) are sent to an order server. At block 2020, a determination is made as to whether the table number and user identifier were sent to the server successfully. If not, flowchart 2000 proceeds to block 2030 where an error is reported to the customer, and the customer is asked to try tapping the table number stand again. If the table number and user identifier were sent successfully, flowchart 2000 proceeds to block 2040 where a determination is made as to whether the table number is valid. If not, flowchart 2000 proceeds to block 2050, where the server stores the table number, the user identifier, date and time to an alarm data table, and the customer's portable device informs the customer that the wrong table number has been received. If the table number is valid, the server updates the order to include the table number (block 2060). At block 2070, flowchart 2000 waits until the customer's order is ready for delivery. Once the order is ready, a new delivery job is sent to a food delivery application (block 2080), and an update is pushed to the customer's portable device (block 2090).

Figure 18:
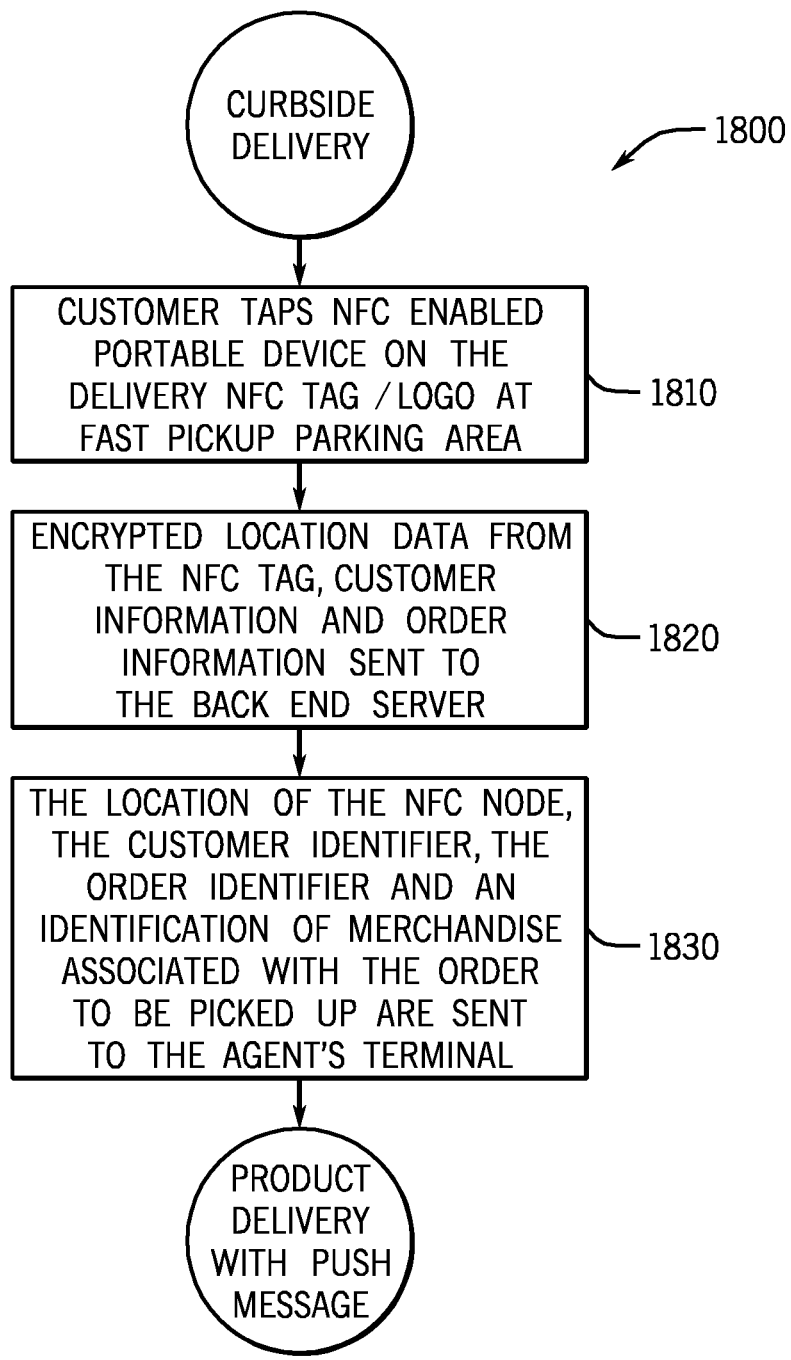
FIG. 18 illustrates a flowchart of a process for initiating a curbside delivery, in accordance with various embodiments of the present invention.

NFC nodes may be utilized to enhance the merchandise pickup experience and even provide for a convenient way of implementing curbside delivery of merchandise. FIG. 18 illustrates a flowchart 1800 of a process for initiating a curbside delivery, in accordance with various embodiments of the present invention. At block 1810, a customer taps her NFC-enabled portable device 1010 on a delivery NFC tag at a fast pickup parking area. Such an area may have, for example, an NFC tag associated with each parking stall/lane. In response to the portable device being tapped against a curbside NFC node, encrypted location data from the NFC node, customer information and order information are then sent to a back-end server (block 1820), such as customer profile server 1030 and/or positioning server 1040. At block 1830, the location of the NFC node, the customer identifier, the order identifier and an identification of merchandise associated with the order to be picked up are sent to a terminal associated with a customer service agent.

Figure 19:
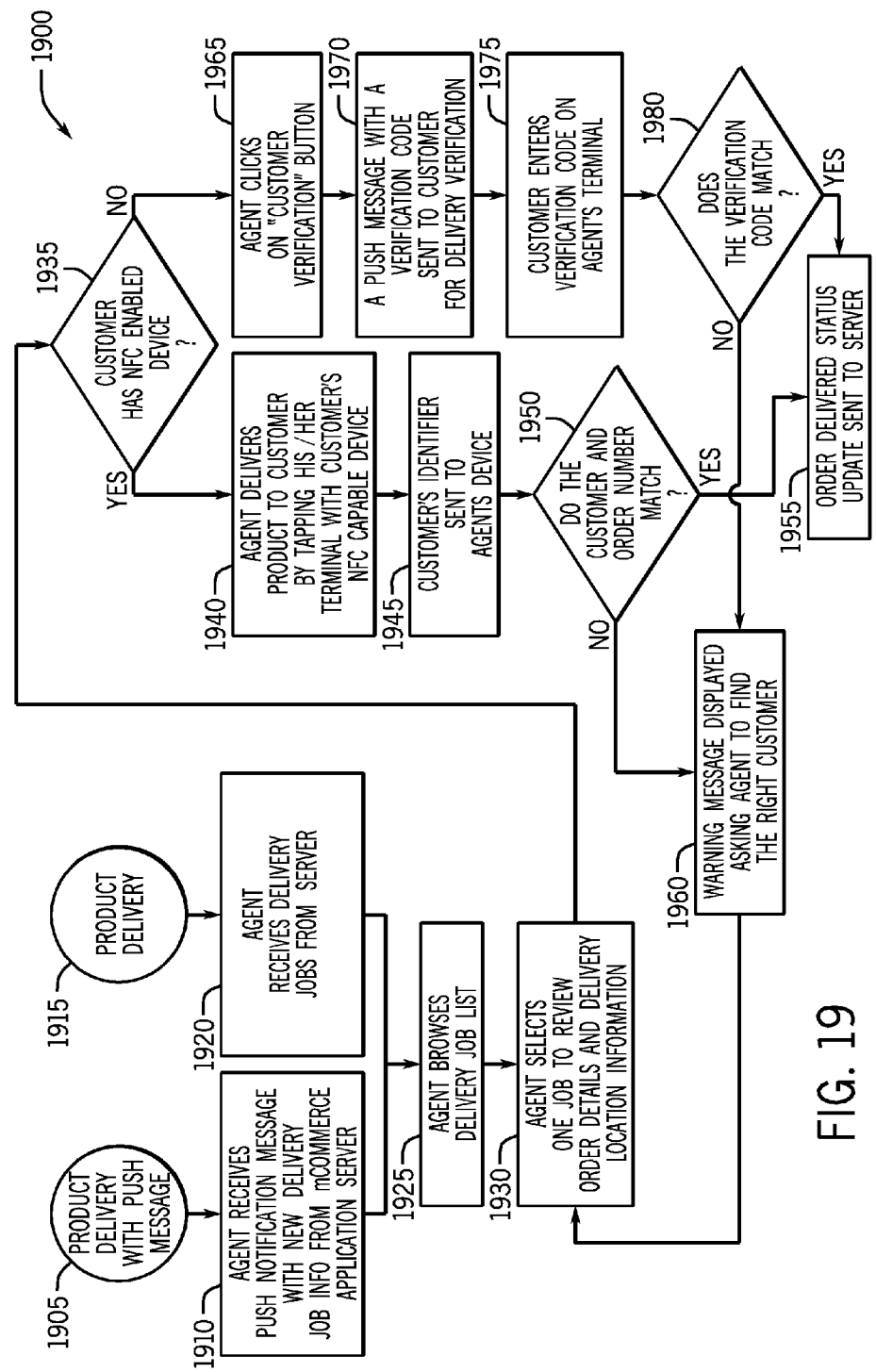
FIG. 19 illustrates a flowchart for a merchandise pickup process, in accordance with various embodiments of the present invention.

The process then continues in FIG. 19, which illustrates a flowchart 1900 for a merchandise pickup process, in accordance with various embodiments of the present invention. Flowchart 1900 may begin as part of a conventional merchandise pickup workflow (block 1915), where an agent receives a queue of delivery jobs from a server (block 1920). Alternatively, flowchart 1900 may begin as part of the product delivery with push message process (block 1905) of flowchart 1800, where an agent receives a push notification message with new delivery job information from an mCommerce application server (block 1910). In either case, flowchart 1900 next proceeds to block 1925, where the agent browses a delivery job list. The agent may then selects a job to review the corresponding order details and delivery location information (block 1930). The agent is then able to collect the merchandise associated with the order. The agent next may initiate a protocol to verify the identity of the customer. In this regard, at block 1935, a determination is made as to whether the customer has an NFC-enabled device. If yes, then flowchart 1900 proceeds to block 1940, where the agent delivers the merchandise to the customer by first tapping her terminal with the customer's NFC-capable device. The customer identifier associated with the customer's portable device 1010 is then sent to the agent's device (block 1945). A determination is then made as to whether received customer identifier matches that associated with the order (block 1950). If yes, then flowchart 1900 proceeds to block 1955, where an "order delivered" status updated is sent to the back-end server. If not, then flowchart 1900 proceeds to block 1960, where a warning message is displayed to the agent asking her to find the correct customer.

Returning again to block 1935, if the customer does not have an NFC-enabled device, flowchart 1900 instead proceeds to block 1965, where the agent selects "customer verification" on her terminal. A push message (e.g. text message) with a verification code is then sent to the customer for delivery verification (block 1970). The customer then enters the verification code on the agent's terminal (block 1975). At block 1980, a determination is made as to whether the entered verification code matches the code pushed in block. If yes, then flowchart 1900 proceeds to block 1955 (discussed above), and if not, flowchart 1900 proceeds to block 1960 (also discussed above).

Thus, various embodiments provide systems and/or methods and allow for accurate—in some embodiments, three-dimensional—geo-location in a retail store environment, allowing customers to easily locate and route paths to desired products without having to track down a store associate for assistance. On the other hand, in situations where personal assistance is needed, various embodiments may be used to request assistance and to direct a store associate to the customer in need. Further, because various embodiments can accurately track a customer's location, valuable "offline" shopping data can collected, towards providing the customer with more appropriate routing (e.g. past frequently-bought items rather than simply the shortest route) and providing the customer with targeted promotional offers based on the customer's offline and/or online shopping behavior. Various embodiments may also further streamline the shopping experience through the use of NFC nodes in both the purchase of products and their subsequent pick-up.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An indoor positioning system for determining the location of a portable device, comprising:
 a radio network comprising a plurality of spaced, short-range, radio network nodes configured to communicate with the portable device and to measure corresponding signal strength from the portable device, and a Near Field Communication (NFC) node configured to communicate with the portable device and at least initially to provide the portable device with configuration information to enable the portable device to communicate with the radio network nodes; and
 a positioning server coupled with the radio network, the positioning server being configured to receive signal strength information from the radio network, to determine a location of the portable device based on the signal strength information, to provide the portable device with a graphical representation of the location of the portable device within a pre-defined floorplan, to receive an indication of a desired product from the portable device, to determine a location of the desired product within the floorplan, to calculate a route from the location of the portable device to the location of the product, and to provide the route to the portable device, wherein the positioning server is configured to determine the location of the portable device in three dimensions based on the signal strength information received from at least four radio network nodes of the radio network.

2. The indoor positioning system as recited in claim 1, wherein the radio network nodes comprise Bluetooth network nodes.

3. The indoor positioning system as recited in claim 1, wherein the radio network nodes comprise a combination of Bluetooth network nodes and 802.11 network nodes.

4. The indoor positioning system as recited in claim 1, wherein the NFC node is configured to notify the positioning server upon coming into communication with the portable device, and wherein the position server is configured to determine that the location of the portable device is generally the location of the NFC node.

5. The indoor positioning system as recited in claim 1, wherein the positioning server is configured to provide the route to the portable device in the form of a graphical representation of the floorplan showing the location of the portable device, the location of the product, and a depiction of the route therebetween.

6. The indoor positioning system as recited in claim 1, wherein the positioning server is configured to provide the route to the portable device in the form of graphical, turn-by-turn directions.

7. The indoor positioning system as recited in claim 1, wherein the positioning server is configured to provide the portable device with information about the desired product.

8. The indoor positioning system as recited in claim 1, wherein the radio network nodes are spaced from each other in both vertical and horizontal planes, and wherein further the positioning server is configured to determine the location of the portable device in three dimensions based on the signal strength information received from the radio network.

9. The indoor positioning system as recited in claim 1, further comprising a customer profile server coupled with the radio network and the positioning server, the customer profile server is configured to store a user profile associated with the portable device and to receive the location of the portable device from the positioning server and the indication of the desired product from the portable device.

10. The indoor positioning system as recited in claim 9, wherein the customer profile server is configured to receive the indication of the desired product from the portable device.

11. The indoor positioning system as recited in claim 10, wherein the customer profile server is configured to provide the portable device with a promotional offer based on the indication of the desired product.

12. The indoor positioning system as recited in claim 10, wherein the customer profile server is configured to provide the portable device with a promotional offer based on the location of the portable device.

13. The indoor positioning system as recited in claim 12, wherein the customer profile server is configured to provide the portable device with the promotional offer based on the location of the portable device after the portable device has been at the same location for a predetermined amount of time.

14. The indoor positioning system as recited in claim 1, wherein the positioning server is configured to provide an updated location of the portable device after a predetermined time interval.

15. The indoor positioning system as recited in claim 1, wherein the positioning server is configured to provide an updated location of the portable device when the location of the portable device moves a predetermined distance.

16. An indoor positioning system for determining the location of a portable device, comprising:
a radio network comprising a plurality of spaced, short-range, radio network nodes configured to communicate with the portable device and to measure corresponding signal strength from the portable device, and a Near Field Communication (NFC) node configured to communicate with the portable device and at least initially to provide the portable device with configuration information to enable the portable device to communicate with the radio network nodes; and
a positioning server coupled with the radio network, the positioning server being configured to receive signal strength information from the radio network, to determine a location of the portable device based on the signal strength information, to provide the portable device with a graphical representation of the location of the portable device within a pre-defined floorplan, to receive an indication of a desired product from the portable device, to determine a location of the desired product within the floorplan, to calculate a route from the location of the portable device to the location of the product, and to provide the route to the portable device,
wherein the portable device is a first portable device associated with a customer, and wherein a customer profile server is configured to send a notification to a second portable device associated with a customer service agent after the portable device has been at the same location for a predetermined amount of time, the notification including the location of the first portable device.

17. The indoor positioning system as recited in claim 16, wherein the notification includes an identification of the desired product.

18. The indoor positioning system as recited in claim 16, wherein the notification includes at least a portion of the user profile.

19. An indoor positioning system for determining the location of a portable device, comprising:
a radio network comprising a plurality of spaced, short-range, radio network nodes configured to communicate with the portable device and to measure corresponding signal strength from the portable device, and a Near Field Communication (NFC) node configured to communicate with the portable device and at least initially to provide the portable device with configuration information to enable the portable device to communicate with the radio network nodes; and
a positioning server coupled with the radio network, the positioning server being configured to receive signal strength information from the radio network, to determine a location of the portable device based on the signal strength information, to provide the portable device with a graphical representation of the location of the portable device within a pre-defined floorplan, to receive an indication of a desired product from the portable device, to determine a location of the desired product within the floorplan, to calculate a route from the location of the portable device to the location of the product, and to provide the route to the portable device,
wherein the portable device is a first portable device associated with a customer, and wherein a customer profile server is configured to receive a request for assistance from the first portable device and, in response thereto, to send a notification to a second portable device associated with a customer service agent, the notification including the location of the first portable device.

20. An indoor positioning system for determining the location of a portable device, comprising:
- a radio network comprising a plurality of spaced, short-range, radio network nodes configured to communicate with the portable device and to measure corresponding signal strength from the portable device, and a Near Field Communication (NFC) node configured to communicate with the portable device and at least initially to provide the portable device with configuration information to enable the portable device to communicate with the radio network nodes; and
- a positioning server coupled with the radio network, the positioning server being configured to receive signal strength information from the radio network, to determine a location of the portable device based on the signal strength information, to provide the portable device with a graphical representation of the location of the portable device within a pre-defined floorplan, to receive an indication of a desired product from the portable device, to determine a location of the desired product within the floorplan, to calculate a route from the location of the portable device to the location of the product, and to provide the route to the portable device,
- wherein a user profile associated with the portable device is linked to an online shopping account and comprises a record of online shopping habits associated with the online shopping account, and wherein a customer profile server which stores the user profile is configured to update the user profile to include information relating to offline shopping habits based, at least in part, on a current or updated location of the portable device as determined by the positioning server.

21. The indoor positioning system as recited in claim 20, wherein the customer profile server is configured to provide the portable device with a promotional offer based on a combination of the online shopping habits and the offline shopping habits.

* * * * *